United States Patent [19]

Mombo-Caristan

[11] Patent Number: 5,603,853
[45] Date of Patent: Feb. 18, 1997

[54] METHOD OF HIGH ENERGY DENSITY RADIATION BEAM LAP WELDING

[75] Inventor: Jean C. Mombo-Caristan, Troy, Mich.

[73] Assignee: The Twentyfirst Century Corporation, Troy, Mich.

[21] Appl. No.: 395,478

[22] Filed: Feb. 28, 1995

[51] Int. Cl.$^6$ .................. B23K 26/00; B23K 15/00
[52] U.S. Cl. .................. 219/121.64; 219/121.14; 428/615
[58] Field of Search .................. 219/121.13, 121.14, 219/121.63, 121.64, 121.73, 121.84; 228/155; 428/615

[56] References Cited

U.S. PATENT DOCUMENTS

| | | |
|---|---|---|
| 3,159,419 | 12/1964 | Kerby . |
| 4,251,709 | 2/1981 | Schumacher .................. 219/121.14 |
| 4,263,496 | 4/1981 | Medlar .................. 219/121.14 |
| 4,591,688 | 5/1986 | Koch et al. . |
| 4,628,179 | 12/1986 | Crahay . |
| 4,650,954 | 3/1987 | Frings et al. . |
| 4,656,332 | 4/1987 | Gross et al. . |
| 4,667,080 | 5/1987 | Jüptner et al. . |
| 4,745,257 | 5/1988 | Rito et al. .................. 219/121.64 |
| 4,769,522 | 9/1988 | Lentz et al. .................. 219/121.63 |
| 4,827,100 | 5/1989 | Frings et al. .................. 219/121.64 |
| 4,833,295 | 5/1989 | Locker et al. .................. 219/121.63 |
| 4,868,365 | 9/1989 | Farone et al. .................. 219/121.64 |
| 4,902,872 | 2/1990 | Frings et al. .................. 219/121.63 |
| 4,945,202 | 7/1990 | Büdenbender .................. 219/121.63 |
| 5,183,992 | 2/1993 | Bilge et al. .................. 219/121.64 |
| 5,245,156 | 9/1993 | Kamogawa et al. .................. 219/121.64 |
| 5,250,783 | 10/1993 | Nishi et al. .................. 219/121.64 |
| 5,303,081 | 4/1994 | Totsuka et al. .................. 219/121.13 |
| 5,371,337 | 12/1994 | Campbell et al. .................. 219/121.63 |
| 5,389,761 | 2/1995 | Kresse, Jr. .................. 219/121.63 |

FOREIGN PATENT DOCUMENTS

| | | |
|---|---|---|
| 57-112986 | 7/1982 | Japan .................. 219/121.63 |
| 64-5691 | 1/1989 | Japan .................. 219/121.64 |
| 3-180286 | 8/1991 | Japan .................. 219/121.64 |
| 4-339583 | 11/1992 | Japan .................. 219/121.64 |
| 593757 | 12/1977 | Switzerland . |
| 1579682 | 7/1990 | U.S.S.R. .................. 219/121.64 |
| WO94/08750 | 10/1993 | WIPO .................. B23K 26/06 |

OTHER PUBLICATIONS

Dawes, *Laser Welding of Sheet Metal Fabrications—Process Improvements*, ICALEO '85, pp. 73–80.

Dawes et al., $CO_2$ *Laser Welding of Deep Drawing Steel Sheet and Microalloyed Steel Plate*, L.I.A. vol. 38 ICALEO 1983, pp. 73–79.

Kymal, *Laser Welding in High Production*, L.I.A., vol. 38, ICALEO 1983, pp. 90–96.

Kim et al., *Laser Welding of Electrical Sheet Steel*, ICALEO '85, pp. 59–63.

(List continued on next page.)

*Primary Examiner*—Teresa J. Walberg
*Assistant Examiner*—Gregory L. Mills
*Attorney, Agent, or Firm*—Nilles & Nilles, S.C.

[57] ABSTRACT

A method of welding at least two sheets using a high energy density radiation beam that preferably is a laser beam or an electron beam for producing a welded lap joint that is substantially completely fused across the width of overlap of the sheets preferably for enabling shaping or forming to be performed such that at least one of the sheets and at least portion of a weld line defined between the overlapped sheets are bent or three dimensionally contoured. In practicing a preferred embodiment of the method, the sheets are overlapped and welded by directing at least one radiation beam toward the overlapped sheets having sufficient power density and for a sufficient amount of time to weld the sheets such that they are substantially completely fused from front to back in the overlap region. As a result, the sheets form a blank that preferably is formed or shaped, such as by shaping, deep drawing, hydro-forming or roll forming, such that at least one of the sheets and a portion of the weld line of the sheets are bent or three dimensionally contoured. After shaping or forming, the sheets preferably form at least part of an article of manufacture.

67 Claims, 7 Drawing Sheets

OTHER PUBLICATIONS

Shinmi et al., *Laser Welding and Its Applications for Steel Making Process*, ICALEO '85, pp. 65–72.

Llewellyn, *Laser Welding of High–Speed Roll–Formed Products*, Lasers in Manufacturing, 1987, pp. 297–301.

Engel, *Tooling Up for Laser Welding*, Society of Manufacturing Engineers, Abstract, 1976.

Mombo–Caristan et al., *Process Controls for Laser Blank Welding*, Automotive Laser Applications Workshop '93, Mar. 1993, pp. 1–7.

Mombo–Caristan et al., *Seam Geometry Monitoring for Tailored Welded Blanks*, ICALEO, 1991, pp. 123–132.

Metzbower, et al., *Laser Beam Welding*, Special Welding Processes, pp. 647–671.

Mombo–Caristan et al., *Tailored Welded Blanks: A New Alternative in Automobile Body Design*, The Industrial Laser Handbook, 1992–1993, pp. 90–102.

Garrison, *Laser Beam Welding Goes Into High–Speed Production of Home Hot Water Tanks*, Welding Journal, Dec. 1993, pp. 53–57.

Hinrichs et al., *Production Electron Beam Welding of Automotive Frame Components*, Welding Journal, Aug. 1974, pp. 488–493.

Baardsen et al., *High Speed Welding of Sheet Steel with a $CO_2$ Laser*, Welding Journal, Apr. 1973, pp. 227–229.

Ward, *A Better Class of Sandwich*, Engineering, May 1991.

Belforte, Levitt, *The Industrial Laser Annual Handbook 1986 Edition*, pp. 16–20;69–70; 116.

Belforte, Levitt, *The Industrial Laser Annual Handbook 1992–93 Edition*, pp. 39–41; 67–69.

Bagger, et al., *Process Behaviour during High Power $CO_2$ Laser Welding of Zinc Coated Steel*, Proceedings of LAMP, Jun. 1992, pp. 553–557.

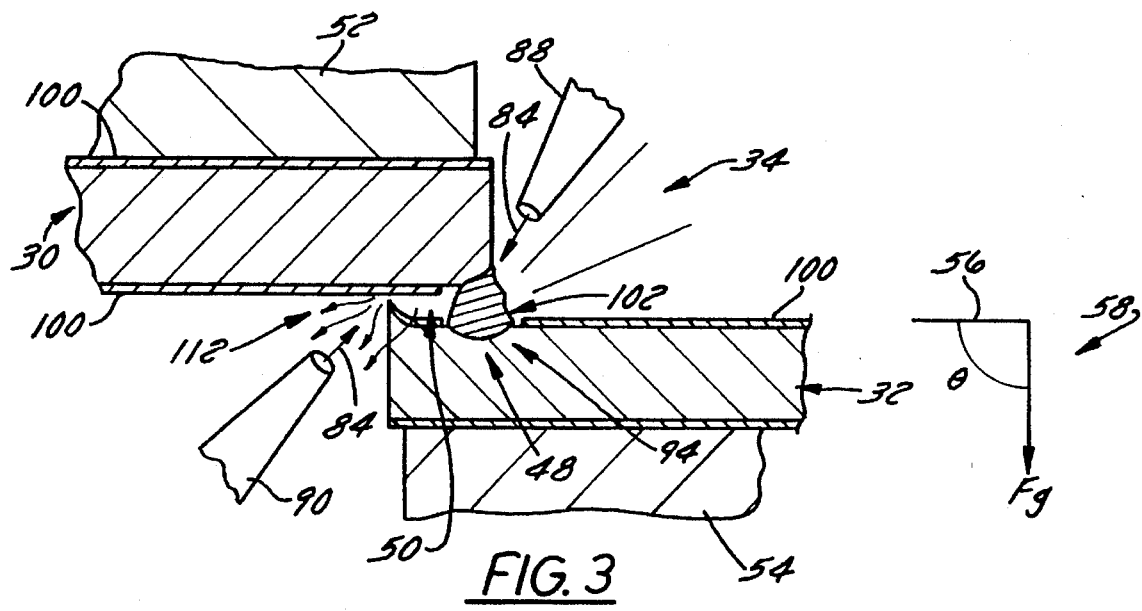
FIG. 3
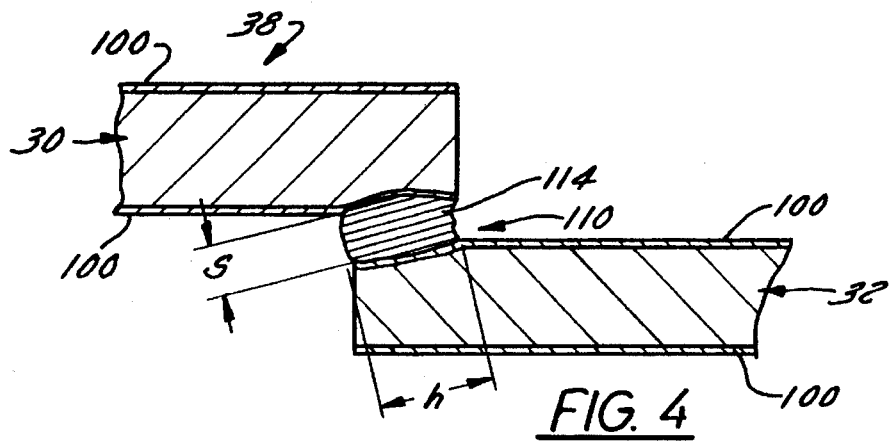
FIG. 4
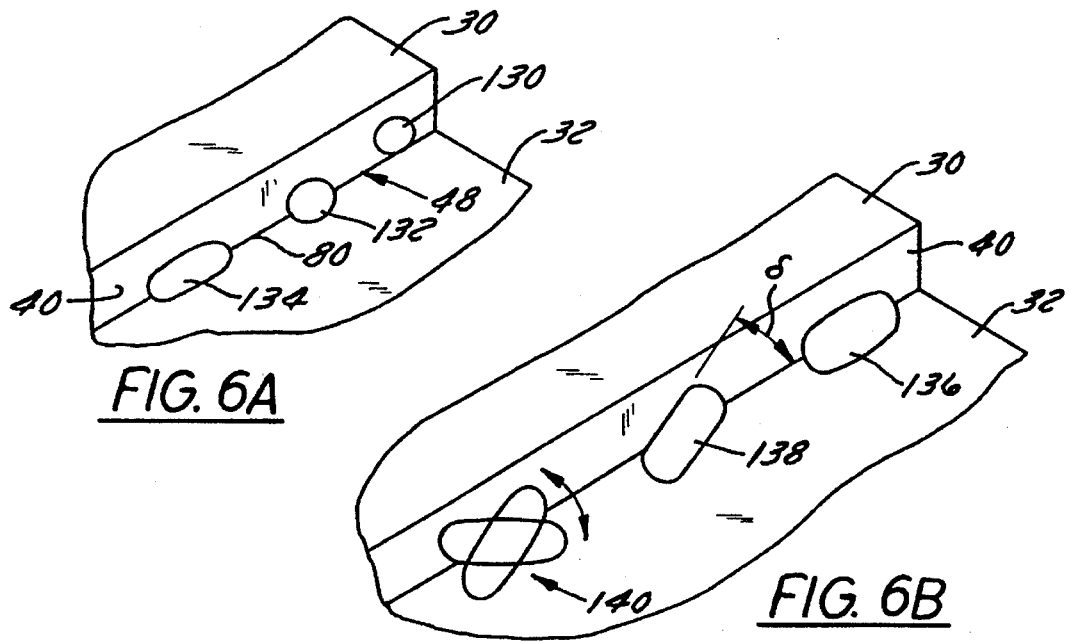
FIG. 6A
FIG. 6B

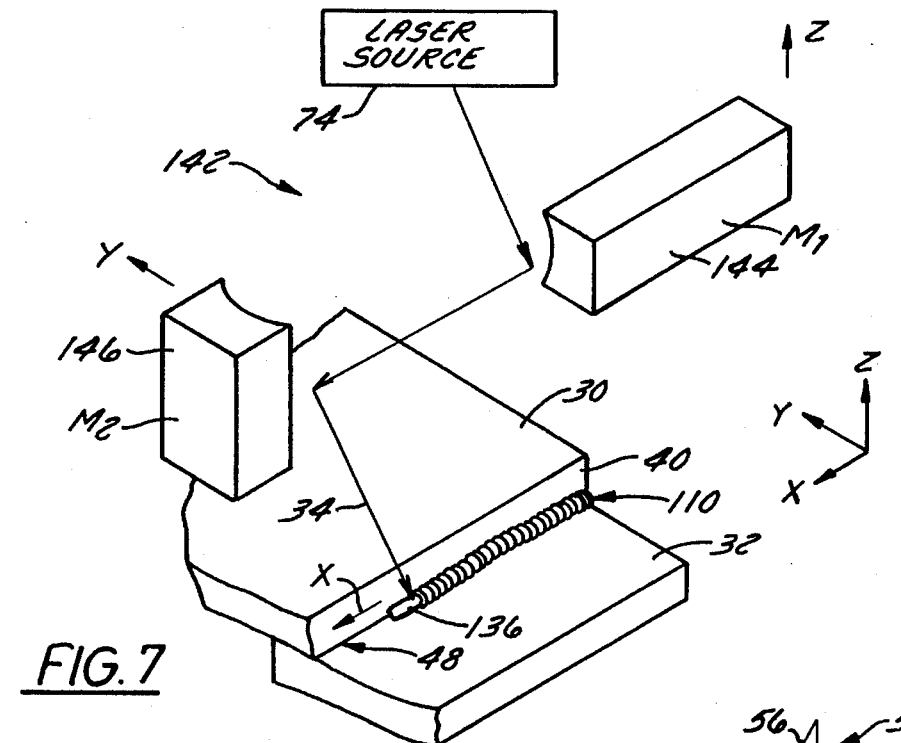
FIG. 7
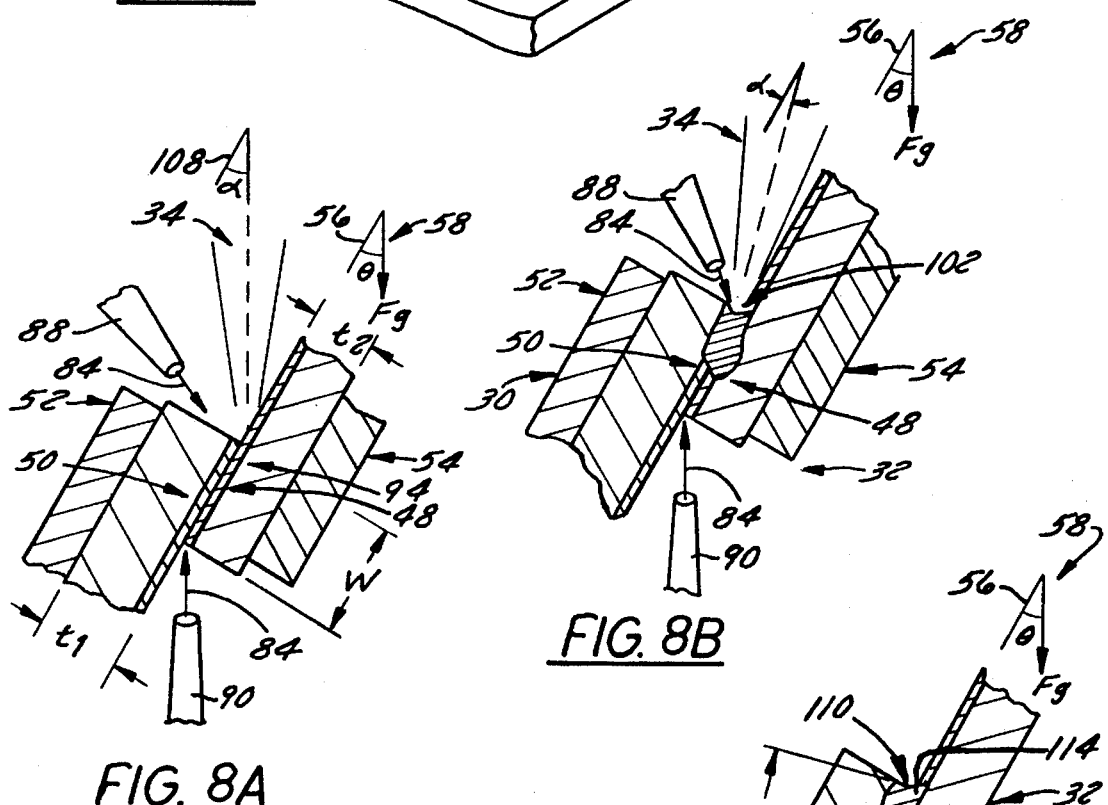
FIG. 8A
FIG. 8B
FIG. 8C

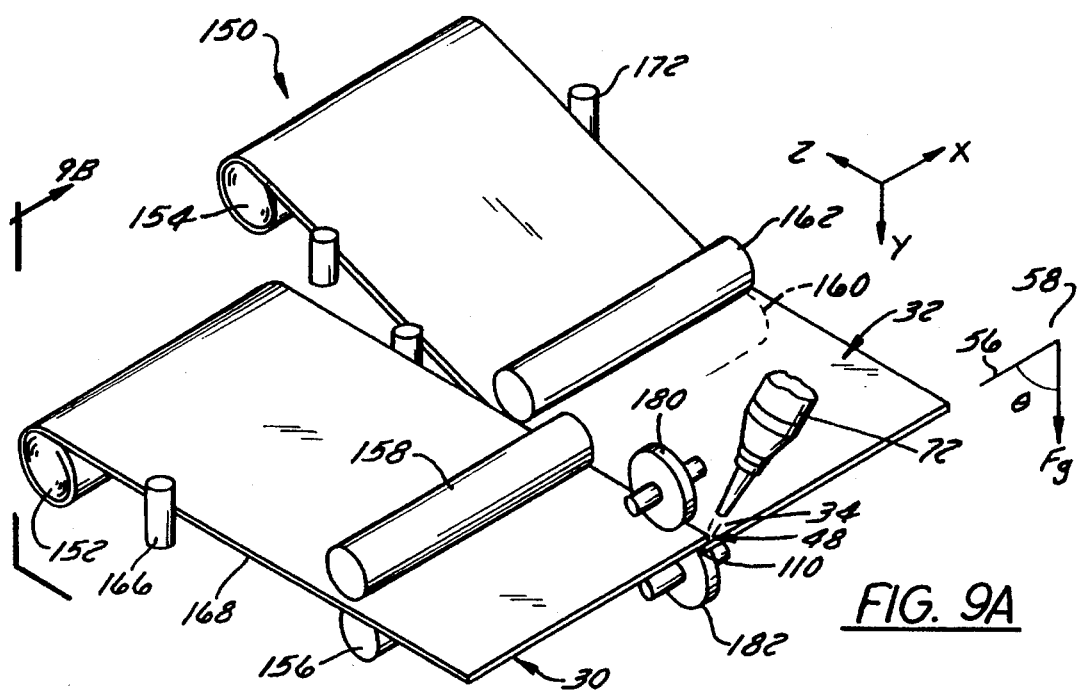
FIG. 9A
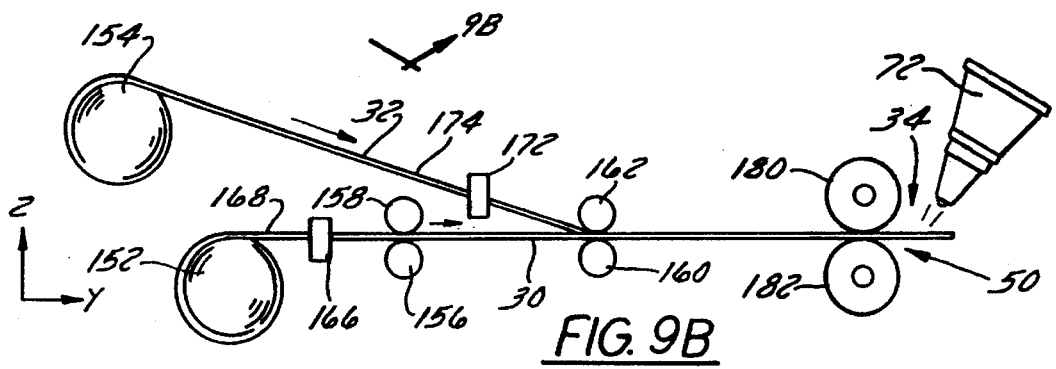
FIG. 9B
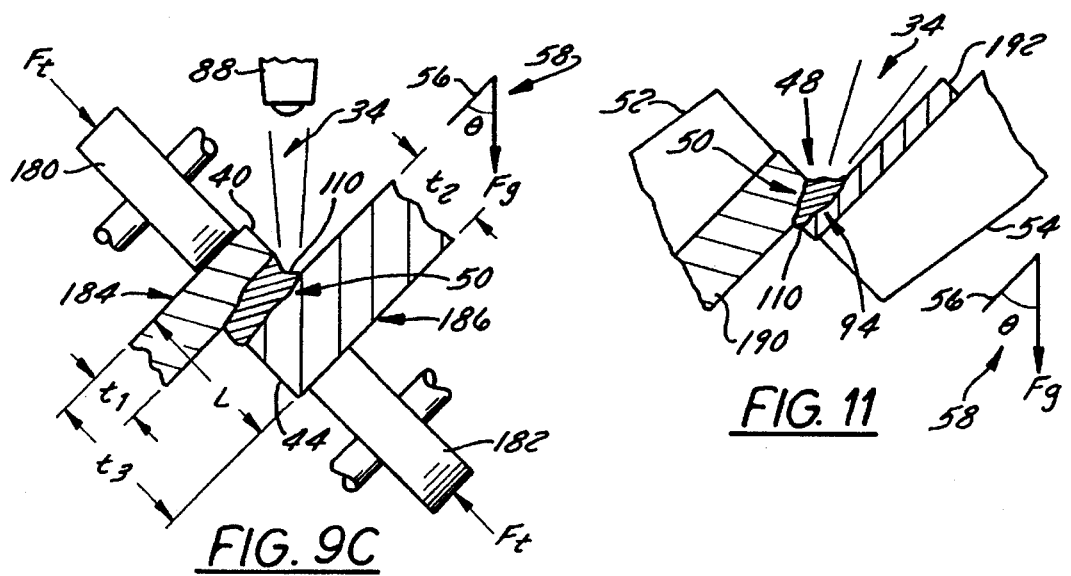
FIG. 9C
FIG. 11

METHOD OF HIGH ENERGY DENSITY RADIATION BEAM LAP WELDING

FIELD OF THE INVENTION

This invention relates to a method of lap welding a first sheet to a second sheet in overlapping relationship with each other using a high density radiation beam such that the resultant weld possesses high peel strength and more particularly to a method of lap welding two sheets that completely fuses the sheets together across their region of overlap for preventing the sheets from peeling apart or wrinkling or buckling in the region of the weld during forming or shaping of the sheets after welding has been completed.

BACKGROUND OF THE INVENTION

High energy density radiation beam welding, such as is accomplished using a laser beam or electron beam, is becoming more widely used to join one sheet to another sheet during the course of manufacturing a product made up of at least in part by the sheets. Laser welders use a highly focused beam of light energy directed onto one or both sheets to join them together, while electron beam welders direct a stream of electrons onto the sheets to be welded to heat them and fuse the sheets together.

One type of welding joint commonly used to secure one sheet to another sheet is a lap joint where an edge portion of one sheet is placed in overlapping fashion against an edge portion of another sheet before welding the sheets together in the overlap region. Typically, before welding, the sheets are held against each other by clamps and the beam is directed against one or both of the sheets to join them together in the overlap region.

In one type of lap joint weld, a partially or fully-through penetrating weld is used to join the sheets together in what is referred a lap seam weld. In producing a lap seam weld, the beam is directed against the upper surface of the top sheet with enough energy density and for a sufficient period of time such that the beam melts and fuses through the top sheet penetrating completely through the top sheet and at least partially through the bottom sheet. However, this type of lap joint welding method produces a weld seam which does not cover the entire overlapping surfaces leaving at least some portion of the overlapped surfaces unwelded.

This results in a lap joint that is open and, therefore, not completely fused where the sheets overlap each other, making it possible, even highly likely, for the sheets to peel apart from each other, as well as wrinkle or buckle, in the region of the lap weld during post-welding forming of the sheets or for the lap seam weld to fail during use of a finished product constructed of the sheets. In addition to low peel strength, an open lap joint can have unfused areas where cracks can easily form, initiating undesirable failure of the weld joint after repetitive or cyclical loading such as what can occur during use of a finished product constructed of the sheets. These unfused areas of the lap weld joint can also collect moisture and contaminants leading to undesirable corrosion in the weld joint which can later also lead to failure of the open lap weld. Additionally, the shear strength of the weld may be poor if the weld is not wide enough which can contribute to poor fatigue strength that, in turn, can cause premature weld failure.

Unfortunately, the integrity of the sheets can be negatively impacted in other ways if the weld is too wide, such as can be characteristic of the laser-mash seam lap welding method disclosed in Büdendbender, U.S. Pat. No. 4,945,202. For example, if sheets are coated with a corrosion resistant coating, such as a zinc coating, heat generated during welding can vaporize the coating leaving the sheets unprotected in the area of the weld. If this unprotected area is too large, the "self-healing" properties of the zinc coating may not be able to prevent corrosion from forming in the weld area as well as in the heat affected zone (HAZ) surrounding the weld. Moreover, even if a lap seam weld of sufficient width could be produced so that it joined the sheets together completely across the overlap of the sheets by weaving the beam across the overlap with the beam impinging on the exposed top surface of the top sheet, it would require a relatively large amount of energy and adversely affect the formability of the sheets because the weld would have a rather large cross-sectional area and surrounding heat affected zone resulting in a more brittle weld region that would not lend itself to be formed successfully, such as by bending, deep drawing, roll-forming, flanging, piercing, or another forming method. Moreover, weaving the beam across the overlap reduces the weld speed and destroys coating on the beam impinging surface, that is, the top surface of the top sheet, and induces coating contamination in the weld nugget.

In addition to the lap seam joints just discussed, another type of lap joint is a lap fillet joint. In a lap edge joint, the sheets are overlapped such that their edges are parallel and generally in line with each other. Unfortunately, for all of these types of lap joints, the joint is open with portions of the overlap unwelded, dramatically reducing peel strength and increasing the likelihood for corrosion as well as making these joints difficult to form or shape after welding without weld failure or forming defects such as wrinkling or buckling occurring.

An alternative to the aforementioned lap joint constructions is conventional mash seam welding, such as is disclosed in Kerby, U.S. Pat. No. 3,159,419. As is disclosed, a pressure roll electrode on each side of the overlapped sheets melts, fuses and welds the sheets together across the overlap region while pressure applied by the rolls reduces the thickness of the overlap. After resistance mash seam welding, the sheets form part of a blank that is formed for later assembly as part of an automobile. However, because of the relatively large cross-sectional size of these welds and its associated HAZ, the weld joints are located away from areas of the blank that are greatly formed or bent.

There are other disadvantages to resistance mash seam welding in addition to lacking formability. One further disadvantage is that resistance mash seam welding is not suited for lap joint welding of more complex two- and three-dimensionally contoured sheets. A still further disadvantage is that any low vaporizing temperature coating on the sheets, such as zinc coating, is vaporized over a wide area during welding which can leave the lap joint with little or no corrosion protection. For sheets having such a coating on both sides, the coating can also vaporize in the overlap area and become trapped in the molten metal leading to welds possessing poor integrity which can lead to premature weld failure.

Lentz, et. al, U.S. Pat. No. 4,769,522, discloses a method of laser welding using a sophisticated apparatus and fixture for joining overlapped ends of a sheet to form a container body. A laser beam is directed into a "mouth" where the sheets are overlapped and acutely angled relative to each other with the beam impinging against portions of the adjacent surfaces of the overlapped sheet ends to heat them above their melting temperature. Before solidifying, the "mouth" is closed by the fixture pressing the sheet ends into overlapping contact with each other to fuse them together in a lap joint arrangement.

The method disclosed in Lentz requires that the sheet ends be accurately spaced apart from each other, accurately located, and fixtured relative to one another during scanning of the sheet by the laser beam before quickly bringing the sheet ends into contact with each other before solidification occurs. Of course, should the sheet ends not be pressed together quickly enough before the sheet solidifies, the resulting weld joint is of poor integrity and low peel strength, both of which could lead to premature weld failure. Therefore, this welding method is susceptible to leaving portions of the overlap unfused reducing significantly formability and weld peel strength while resulting in decreased corrosion protection in the weld region.

An article in the December 1993 issue of the periodical *Welding Journal* entitled "Laser Beam Welding Goes into High-Speed Production of Home Hot Water Tanks", discloses a method of laser welding for joining together two generally cylindrical tank halves to form a tank of a hot water heater. The bottom tank halve has a radially outwardly turned lip for guiding the top tank halve into tight-fitting, intimate contact with the lower halve necessary for welding the two halves completely about their peripheries. There must be no fit-up gap anywhere along the weld joint interface where the upper and lower tank halves are overlapped so that the laser beam will not pass through the joint interface during welding. Unfortunately, the unwelded portion of the outwardly turned lip of the upper tank halve used to guide the lower tank halve into tight-fitting contact produces an open lap joint adversely affecting the peel strength of the weld joint. Additionally, because this welded joint is open, it is also susceptible to crack formation and corrosion. Furthermore, if deep drawing of the weld region is attempted after welding is performed, the weld can yield to crack failure because of reduced peel strength in the weld region and due to wrinkling and buckling in the area of the lap joint because of the aforementioned unwelded overlapping outwardly turned lip.

Autogenous laser and electron beam butt-welding methods have been used to form blanks prior to forming them, as is disclosed in the 1992–93 edition of *The Industrial Laser Handbook* entitled "Tailored Welded Blanks: A New Alternative in Automobile Body Design" and in an August 1974 article in the periodical *Welding Journal* entitled: "Production Electron Beam Welding of Automotive Frame Components". In constructing a tailored welded blank component, a first sheet is cut to the desired shape and butt-welded to another sheet using a laser or electron beam gun. After welding, the component is formed. However, before butt-welding, accurate edge preparation of the sheets where they are to be joined must be done so that the edge of one of the sheets is virtually perfectly parallel to the edge of the other sheet before butt-welding can be performed.

Even when done properly, however, edge preparation is time consuming and costly. Typically, during edge preparation, the edge of each sheet to be joined is machined to make it parallel with the edge of the other sheet so that there is virtually no gap between the sheets when they are butted against each other for welding. If edge preparation is not properly performed, when the edges of the sheets are butted against each other to be welded, any gap that is too large between the sheet edges can result in a poor weld joint between the sheets. This can lead to the sheets not being joined together in that area, possibly causing weld failure during forming or even more undesirably, later, when the sheets are in use.

Conventional welding methods, such as shielded metal-arc, submerged arc, self-shielded flux-core and gas-shielded arc welding processes, are also not suitable because the resultant welded sheets cannot be easily formed, especially deeply drawn, in the region of the weld without negatively impacting weld strength and weld integrity, possibly resulting in weld failure during forming as well as cracking or peeling of the weld joint as well as wrinkling or buckling in the region of the weld. Conventional welding methods are also ill-suited for welding sheets having corrosion resistant or low vaporizing temperature coatings because they produce relatively wide welds destroying the coating across the region of the weld and its surrounding HAZ. Finally, the production rates that can be achieved using conventional welding processes are relatively slow, further making their use in these types of applications economically undesirable.

SUMMARY OF THE INVENTION

The present invention is directed to a method of lap welding using a high energy density radiation beam for joining one sheet that has been overlapped with another sheet to form a lap joint having an overlap interface or a weld interface where the sheets are overlapped by acutely angling the beam relative to the plane of the interface and training the acutely angled beam on at least one of the sheets for producing a lap weld in the overlap region that fuses the sheets completely together across the overlap region such that the weld possesses high peel strength to enable the sheets to be formed after welding. The lap welding method of this invention utilizes a high energy density radiation beam that preferably is a laser beam, or a beam of electrons, for producing a lap weld having no unfused area in the region of the weld interface of the sheets so that the sheets will not peel apart, wrinkle, buckle or split apart in the area of the weld during forming or shaping of the sheets after welding is completed or during use after forming.

The resultant lap weld construction minimizes dust collection and corrosion in the weld region because cracks and crevices in the lap weld are minimized and are preferably prevented. Finally, the resultant lap weld construction also prevents fatigue failure because the lap weld joint is substantially completely fused and welded, virtually eliminating any crack initiation sites in the region of the weld.

Preferably, the sheet material is a metal such as aluminum, steel, copper or another metal. The sheets can be coated with an organic or a metallic coating, such as, for example, a zinc coating, if galvanized material is to be used.

In operation, the sheets are overlapped and fixtured for welding with one edge of one of the sheets overlying the other of the sheets and the edge of the other sheet underlying the one sheet forming a lap joint. Preferably, the width of overlap of the sheets is at least 50% of the thickness of the sheet having the thinnest cross sectional thickness and is no greater than the smallest of either of the following: preferably, about twice the thickness of the thinnest sheet or 1.5 times the thickness of the thickest sheet, for producing a welded lap joint of high strength, good integrity and possessing high peel strength.

If the edge of either sheet or both sheets have burrs from processing, such as during slitting, cutting, or blanking the sheet edges, the sheets can be overlapped such that any burrs space one sheet apart from the other sheet along at least a portion of the region of sheet overlap, preferably creating a gap between the sheets. Preferably, the gap created between the sheets in the region of overlap is no greater than about 0.10 millimeters, is preferably less than about 10% of sheet thickness and is typically about 0.05 millimeters or less. Of course, the adjacent surfaces of the sheets where they are overlapped can bear against each other with no gap at all between them. If the sheets are fixtured for welding by clamps, preferably, clamp pressure or distance between the clamps can be varied to regulate the gap between the sheets so that the gap is not too large to prevent allowing an excessive amount of beam energy to pass through the weld interface during welding.

After the sheets have been fixtured, the beam is trained on one or both sheets to weld them together. During welding, the beam is preferably acutely angled relative to the plane of the overlap or interface and is directed toward the plane of the overlap interface. Preferably, the beam is trained on the forward edge of one of the sheets and the adjacent surface of the other sheet or only on the forward edge of one of the sheets. To influence the formation, geometry and flow of the weld nugget during welding, the sheets can be oriented relative to the direction of gravity, $F_g$, so that the plane of the overlap or weld interface is acutely angled relative to the direction of gravity, $F_g$.

When welding is completed, the resultant lap weld extends from front to back of the weld interface or overlap of the sheets leaving no region of the overlap unfused to provide the weld with high peel strength so that the sheets will not peel apart during forming or shaping of the sheets, even in the region of the weld. Preferably, after welding is completed, the sheets form a blank that is shaped or formed using any shaping or forming method.

Objects, features and advantages of this invention are to provide a method of welding using a high energy density radiation beam for joining sheets overlapped in a lap joint configuration which produces a weld having high peel strength and which will not peel apart during forming of the sheet after welding; produces a blank that can be conventionally formed even in the region of the weld such as by shaping, deep drawing, flanging, piercing, blanking, spinning, hydro-forming, bending, roll forming, die stamping, trimming, or any other forming method; utilizes the direction of gravity to influence formation, geometry and flow of the weld nugget during welding to facilitate producing a lap weld of high peel strength; can utilize the direction of gravity to advantageously orient relative to the plane of the weld interface the keyhole in the weld region created during high energy density beam welding; is easily adaptable to a continuous laser welding apparatus for continuously lap welding a pair of sheets uncoiled from coil stock and overlapped with each other; is tolerant of joint fit-up gap in the overlap region and thereby minimizes or eliminates edge preparation before welding; can advantageously be used to lap weld sheets of unequal thicknesses with one of the sheets being thicker than the other; can be used to lap weld two sheets of equal thickness; can be used with both autogenous and filler metal welding applications; can be used to lap weld sheets of relatively thin cross sectional thickness of 5 millimeters or less; can be used to lap weld sheets spaced slightly apart by metal processing burrs; can be used to join sheets coated with organic or inorganic coatings; is economical because it can be used to unpeelably lap weld two sheets together with each of the sheets having different desired mechanical or other desired properties to form a blank that can be later conventionally formed to produce a product having the desired properties in desired area of the finished product; is a method that is simple, flexible, economical and reliable; and which produces a lap weld that has no unfused area across the region of the overlap from front to back of the overlap, is durable, possesses good integrity, high peel strength, high tensile strength, and high fatigue resistance to cyclical and repetitive loading, and which will not peel apart during shaping or forming of the weld region.

BRIEF DESCRIPTION OF THE DRAWINGS

These and other objects, features and advantages of this invention will become apparent from the following detailed description of the best mode, appended claims, and accompanying drawings in which:

FIG. 3 is an enlarged fragmentary sectional view of the sheets of FIG. 2 taken along line 2—2 illustrating the sheets being welded;

FIG. 4 is an enlarged fragmentary sectional view of the sheets of FIG. 2 illustrating the resultant lap weld after welding has been completed;

FIG. 6A illustrates circular and oblong focused beam spot shapes;

FIG. 6B illustrates generally rectangular focused spot shapes;

FIG. 7 is a perspective view of a pair of overlapped sheets being welded using the welding method of this invention by a laser beam having a generally rectangular focused spot;

FIG. 8A is an enlarged fragmentary sectional view of a pair of sheets overlapped, fixtured and oriented relative to gravity for being lap welded by a high energy density radiation beam using the method of welding of this invention;

FIG. 8B is an enlarged fragmentary sectional view of the sheets of FIG. 8 illustrating the sheets being welded while oriented relative to gravity;

FIG. 8C is an enlarged fragmentary sectional view of the overlapped sheets oriented relative to gravity illustrating the resultant lap weld after welding has been completed;

FIG. 9A is a perspective view of an apparatus for continuously lap welding a pair of sheets from coil stock together using the welding method of this invention;

FIG. 9B is a side view of the continuous welding apparatus in the direction of 9B—9B of FIG. 9A;

FIG. 9C is an enlarged fragmentary view of the overlapped sheets being welded by the continuous welding apparatus of FIG. 9A;

FIG. 11 is an enlarged fragmentary sectional view of the clamped sheets during welding;

DETAILED DESCRIPTION OF THE INVENTION

Figure 1:
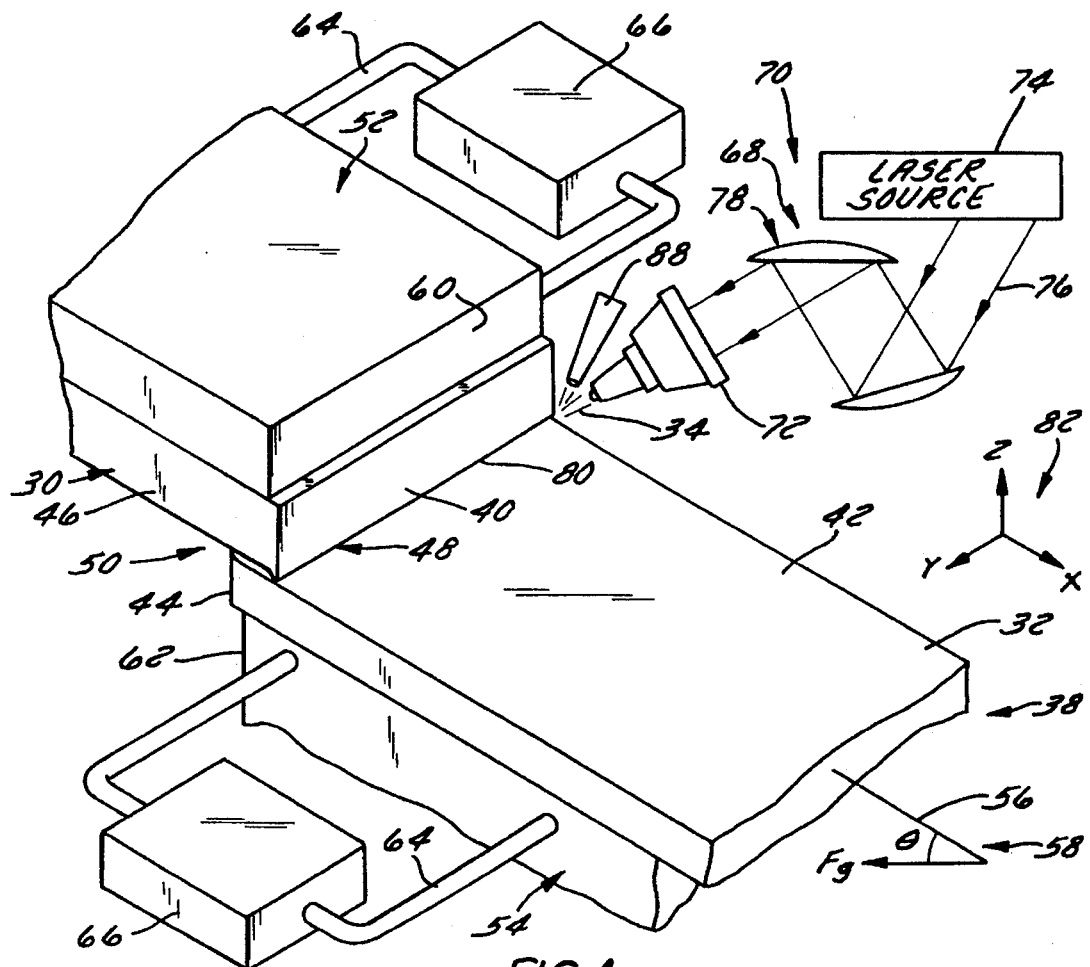
FIG. 1 is a perspective view of a pair of sheets overlapped and fixtured with its plane of overlap acutely oriented to the direction of gravity and being lap welded by a high energy density radiation beam using a method of welding of this invention.

Referring now to the drawings, FIGS. 1–4 illustrate a method of lap welding a first or top sheet 30 overlapped with a second or bottom sheet 32 using a high energy density radiation beam 34 for joining the sheets 30 & 32 together producing a lap weld 110 having high peel strength such that the sheets 30 & 32 preferably create a blank 38 that can be formed after welding using conventional forming methods such as bending, deep drawing, roll forming, hydro-forming, shaping, flanging or another shaping or forming process without the sheets 30 & 32 peeling apart during forming. To enable the sheets 30 & 32 to be joined together using a high energy density radiation beam 34, the sheets 30 & 32 are preferably constructed of weldably similar material and are preferably constructed of metal such as a steel, aluminum, copper, or another metal capable of being welded. Alternatively, there may be applications of this invention where non-weldable, dissimilar materials, such as nickel and silver, can be diffusion bonded together if sufficient pressure is applied simultaneously with the heat input of the laser. Preferably, the high energy density radiation beam 34 is a laser beam. Alternatively, an electron beam can be used as the high density radiation beam.

Advantageously, this method of high energy density beam welding enables two or more sheets to be lap welded together to produce a blank 38 that can be formed after welding with the sheets being selected to impart to the blank 38 and finished product formed from the blank 38 certain desired mechanical properties, at least in the region of that sheet having the desired properties. By imparting to the blank 38 desired mechanical properties only where needed, thinner gauge and/or less expensive sheet material can be used elsewhere where these properties are not needed, making the blank 38 less costly to manufacture while still being suitable and optimized for its intended use after forming is completed.

As is shown more clearly in FIG. 1 the top sheet 30 is placed in overlapping relationship with the bottom sheet 32 such that its forward edge 40 overlies the top surface 42 of the bottom sheet 32 and the forward edge 44 of the bottom sheet 32 underlies the bottom surface 46 of the top sheet 30 creating an overlap interface or a weld interface 48 in the region of overlap 50 of the sheets 30 & 32. To maintain the sheets 30 & 32 in overlapping relationship with each other during welding, they are held in place by a pair of staggered and spaced apart clamps or fixtures 52 & 54. Preferably, the clamps 52 & 54 orient the overlapped sheets 30 & 32 such that the plane 56 of the weld interface 48 is acutely angled relative to the direction of gravity, $F_g$, as is indicated by the angle θ of the angular indicator 58 shown in FIG. 1, so that the direction of gravity influences welding of the sheets 30 & 32.

Typically, as is shown in FIG. 1, at least a portion of the clamps 52 & 54 overlap each other so that they support the sheets 30 & 32 in the overlap region 50. Preferably, a forward edge 60 of the top clamp 52 is spaced slightly from the forward edge 40 of the top sheet 30 and a forward edge 62 of the bottom clamp 54 is spaced from the forward edge 44 of the bottom sheet. Preferably, the forward edge 60 of the top clamp 52 is positioned close to the forward edge 40 of its associated sheet 30. Preferably, for example, the forward edge of the top clamp 44 is positioned about 0.2 millimeters from the forward edge 40 of the top sheet 30. However, for sheets of very thin cross sectional thickness, such as, for example, 5 millimeters or less in thickness, the edge of the clamp may have to be spaced even closer to the forward edge of the sheet it is supporting to properly fixture and support the sheets during welding.

To remove heat from each sheet during welding, each clamp or fixture 52 & 54 can have a channel 64 through it with a coolant 66 flowing through the channel 64 to remove the heat. Suitable coolants such as air, water, a suitable gas refrigerant, an alcohol-water mixture, or another conventional refrigerant can be used. To provide good heat transfer from each sheet 30 & 32 to its associated fixture 52 & 54, each fixture is preferably constructed of copper or another good heat conducting substance or metal. However, this clamp substance or metal must possess a high melting temperature and is preferably not weldable to the material of sheet 30 or 32. Alternatively, rather than removing heat by conduction, heat can be removed from the sheets 30 & 32 during welding by blowing air onto the sheets, thereby removing heat by convection such as forced convection.

After the sheets 30 & 32 have been fixtured, a high energy density radiation beam welding apparatus 68, such as the laser 70 shown in FIG. 1, emits a beam 34 of high density radiation from a gun assembly 72 that impinges against one or both sheets 30 & 32 at the overlap or weld interface region 48 that constitutes the region where the sheets 30 & 32 overlap 50 each other. As is shown in FIG. 1, the laser welding apparatus 70 has a laser source 74, such as a $CO_2$ laser, CO laser, excimer laser, or a solid state laser, for producing an unfocused laser beam 76. The unfocused beam 76 is focused and trained onto at least one of the sheets 30 & 32 during welding to heat the sheet material above its melting point or melting points so that it will fuse the two sheets together. The unfocused beam 76 can be directed and focused by a series of optics 78, such as lenses or mirrors, to control the shape of the focused beam 34 or to further control the movement of the beam 34 relative to the sheets 30 & 32.

During welding, the laser gun assembly 72 moves relative to the clamped sheets 30 & 32 so that the focused beam 34 travels along a weld line 80 relative to the sheets 30 & 32 along and generally tangent to the weld interface 48 to weld the sheets 30 & 32 preferably across the entire width of the interface 66 so that there is no unfused area across the region of overlap 50 where the beam 34 has impinged. As is shown by the direction-indicating arrow in FIG. 1, during welding, the beam 34 travels relative to the interface 48 in the Y direction as is shown by a three-dimensional coordinate reference axis 82 illustrated.

So that the sheets 30 & 32 move relative to the focused laser beam 34, the fixtured sheets can remain stationary while the beam moves in the +Y direction in the direction of the arrow shown in FIG. 1. Alternatively, the beam 34 can remain stationary while the clamps 52 & 54 carry the sheets 30 & 32 generally in the −Y direction by the beam 34 to weld them together.

To move the beam 34 along the sheets, the laser gun assembly 72 is preferably carried by a robot or a gantry (not shown) that moves the gun 72 along the weld interface 48 of the sheets 30 & 32. Such a gantry could be a one-dimensional gantry if the sheets have straight edges overlapped with each other, a two-dimensional gantry if, for example, the overlapped sheet edges are curved or otherwise non-linear, or a three-dimensional gantry is preferably used if the overlapped sheet edges are three-dimensionally contoured.

Figure 2:
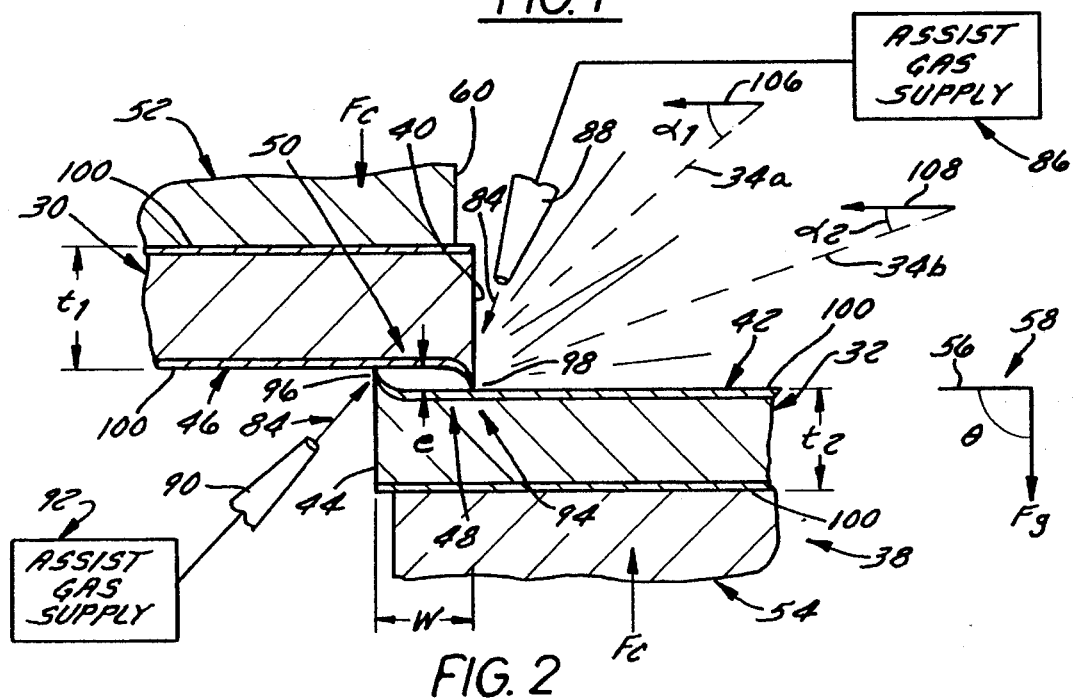
FIG. 2 is an enlarged fragmentary sectional view of the overlapped sheets oriented generally horizontally relative to the direction of gravity.

FIG. 2 illustrates the sheets 30 & 32 overlapped, fixtured and oriented relative to the direction of gravity, $F_g$, such that the plane 56 of the interface 48 is generally horizontal to the direction of gravity, $F_g$, with θ being about 90°. During welding, an assist gas 84, such as argon, helium, nitrogen, another conventional assist gas, or a suitable combination of assist gases is directed from an assist gas supply 86 through an injection nozzle 88 onto the area of the sheets 30 & 32 being welded in the vicinity where the focused laser beam 34 is impinging against the sheet or sheets for preventing gaseous contamination of the weld, such as from oxygen, hydrogen, and/or other undesirable gases diffusing into the molten sheet material at the weld interface 48. Preferably, as is shown more clearly in FIGS. 2 & 3, a second assist gas injector 90 is provided for directing a supply 92 of assist gas toward the back or "root" side of the interface 48 to prevent undesirable gases from diffusing into the weld and for smoothing the geometry of the molten weld metal during welding to provide a better weld when finished. Although a separate assist gas supply is shown for each injection nozzle 88 & 90 in FIG. 2, both assist gas injector nozzles 88 & 90 can share a common gas supply.

As is shown in FIG. 2, the top sheet 30 has a thickness of $t_1$ and the bottom sheet 32 has a thickness of $t_2$ and the sheets 30 & 32 have a width of overlap, w, in the region of overlap 50 of the sheets 30 & 32 which also constitutes the cross section width, w, from front to back of the weld interface 48. Preferably, if $t_1$ differs from $t_2$, then the top sheet 30 where the beam 34 is impinging upon is the thickest of both sheets 30 & 32. When overlapped, the front edge 40 of the top sheet 30 overlies the upper surface 42 of the bottom sheet 32 and the front edge 44 of the bottom sheet 32 underlies the bottom surface 46 of the top sheet 30 such that the width of overlap, w, is the distance from the forward edge 40 of the top sheet 30 to the forward edge 44 of the bottom sheet 32 creating a lap joint 94 ready to be welded.

To produce a weld of high peel strength and good integrity, the width of overlap, w, is preferably equal to or greater than 50% of the thickness of the thinnest sheet whether it be the top sheet 30 or the bottom sheet 32 and is, preferably, no greater than the smaller of either twice the thinner sheet thickness or about 1.5 times the thicker sheet thickness. Hence, if the top sheet 30 has a thickness, $t_1$, of 3 millimeters and the bottom sheet 32 has a thickness, $t_2$, of 4 millimeters, the width of overlap, w, of the sheets 30 & 32 is at least 1.5 millimeters and can be up to 6 millimeters, for example, depending upon the strength required of the lap weld.

Preferably, no edge preparation of either sheet 30 or 32 is required before fixturing and welding is performed. If no edge preparation is performed before welding, the sheets 30 & 32 can be overlapped with one or both sheets having an outwardly projecting burr 96 or 98 spacing the sheets 30 & 32 apart in the region of overlap 50 creating a gap, e, between the sheets 30 & 32. These burrs 96 & 98 shown in FIGS. 2 & 3, extend outwardly from the sheet edges and are typically caused by deformation of the sheet material at the sheet edge during cutting, slitting, or blanking that has been performed before welding to cut the sheet to the desired size or shape. Alternatively, however, the sheets 30 & 32 can be overlapped and placed against each other without being spaced apart by any gap such as where the sheets have no burrs protruding toward the joint interface 48 or if edge preparation has been performed.

As is shown in FIG. 2, the sheets 30 & 32 at the lap joint 94 are spaced apart by the gap, e, at least where a burr of one of the sheets 30 or 32 bears against a surface 42 or 46 of the other sheet. Therefore, the gap distance, e, is dependent upon the length of the burr projecting furthest outwardly generally perpendicularly from the sheet having that burr. As such, the sheets 30 & 32 are spaced apart a distance, e, at the longest burr and can be spaced apart a distance somewhat less than e depending upon the height of the other burr, the orientation of one sheet relative to the other sheet, as well as how the sheets 30 & 32 are fixtured relative to each other. Of course, e, can vary longitudinally along the length of the lap joint interface 48 due to irregularities in the metal cutting, slitting, or blanking process or due to dimensional variations in one or both sheets 30 & 32.

If the sheets 30 & 32 are spaced apart, the gap distance, e, is preferably not very large to prevent too much of the laser beam 34 from passing through the gap, e, between the sheets 30 & 32, particularly, if the beam 34 is inclined at a relatively small angle relative to the plane 56 of the weld interface 48. Preferably, e, is typically about 0.05 millimeters and is preferably no greater than 0.1 millimeters or 10% of sheet thickness so that only a negligible amount of the beam 34, or preferably no portion of the beam 34, passes through the joint 94 during welding. If any portion of the beam 34 does pass through the gap between the sheets 30 & 32 during welding, preferably enough of the beam 34 contacts sheet material such that it sufficiently heats the sheet material above its melting temperature to melt, fuse and weld the sheet material so that it forms a weld of good integrity, high tensile strength, good fatigue resistance to cyclical or repetitive loading, and high peel strength.

To regulate the gap distance, e, as well as maintain the sheets 30 & 32 in overlapping relationship with each other during welding, each clamp 52 & 54 preferably can apply at least a light clamping pressure or force, $F_c$, to the sheet it bears against. As such, the clamping pressure, $F_c$, can preferably be regulated and controlled so as to produce an acceptable gap distance, e, between the overlapped region 50 of the sheets 30 & 32, such that e is less than 0.1 millimeter, for example, to ensure sufficient energy is transferred from the laser beam 34 to the sheet material.

If the sheets 30 & 32 are coated, pressure can be preferably controllably applied to the sheets 30 & 32 to reduce the space between the sheets 30 & 32 during welding while enabling coating that has vaporized into gas to escape from the weld interface 48 to prevent the coating vapor from becoming trapped in the weld or otherwise contaminating the weld. As such, the clamping pressure, $F_c$, of each clamp 52 & 54 preferably can be controlled so as to apply sufficient pressure to the sheets so as to reduce or control the gap, e, between the sheets 30 & 32 during welding while allowing coating vaporized during welding to escape from the overlap or weld interface 48. If desired, rather than regulating clamping force, $F_c$, the spacing between the clamps 52 & 54 can be controlled to regulate the gap, e, between the overlapped sheets 30 & 32.

As is further illustrated in FIG. 2 and shown in more detail in FIG. 3, if the sheets 30 & 32 are coated with a low vaporizing temperature coating 100, such as zinc (galvanized sheet), the spacing, e, of the gap between the sheets 30 & 32 preferably provides a path between the sheets 30 & 32 for enabling coating vapor in the weld interface 48 to travel away from the interface 48 to prevent it from becoming trapped in the lap after it has solidified. As is shown in FIGS. 2 & 3, both the top and bottom surface of each sheet 30 & 32 can be coated with a low vaporizing temperature coating 100, such as in the instance where galvanized sheeting is lap welded to form a blank 38 that is to be formed after welding.

FIG. 2 depicts an angular indicator 58 for indicating the angle, θ, of the plane 56 of the interface 48 relative to the direction of the force of gravity, $F_g$. As is demonstrated by the particular welding setup shown in FIG. 2, the plane 56 of the interface is generally horizontal and therefore, θ, is approximately about 90°. Although the sheets 30 & 32 are shown in FIGS. 2 through 4 with the plane 56 of the weld interface 48 generally horizontal relative to the direction gravity, $F_g$, the plane 56 of the interface 48, can be angled relative to the direction of gravity, $F_g$, so that the direction of gravity will influence the formation, flow and/or geometry of a weld nugget 102 (FIG. 3) of molten sheet material that forms a lap 104 (FIG. 4) after welding is completed.

For overlapped sheets having a relatively small width of overlap, w, such as in the case for sheets that are relatively thin, the plane 56 of the weld interface 48 can be horizontal relative to the direction of gravity, $F_g$. Preferably, however, the plane 56 of the interface 48 is acutely angled relative to the direction of gravity, $F_g$, such as is illustrated more clearly in FIG. 1 and FIGS. 8A–8C, so that the direction of gravity, $F_g$, will influence the formation, flow, and/or geometry of the nugget 102 while it is in a molten, liquefied state. For sheets 30 & 32 having a larger width of overlap, such as for lap welding thicker sheets, the plane 56 of the weld interface 48 is preferably acutely angled relative to the direction of gravity, $F_g$, such as is depicted in FIGS. 8A–8C.

To weld the overlapped sheets 30 & 32, the laser beam 34 is acutely angled relative to the plane 56 of the weld interface 48 and directed against the forward edge 40 of the top sheet 30 such as is depicted by beam 34a in FIG. 2, or at both sheets 30 & 32 and generally toward the plane of the interface 48, such as is depicted by beam 34b in FIG. 2. Preferably, the central axis, shown in phantom in FIG. 2, of the beam 34a directed against the forward edge 40 of the top sheet 30 forms an acute angle, $\alpha_1$, with a plane 106 parallel to the plane 56 of the interface 48 as is indicated in FIG. 2. Preferably, the central axis, also shown in phantom in FIG. 2, of the beam 34b directed at both sheets 30 & 32 and generally toward the plane 56 of the interface 48 forms an acute angle, $\alpha_2$, with a plane 108 parallel to the plane of the interface 48 as is also indicated in FIG. 2.

Preferably, the angle, α, of the beam 34 relative to a plane parallel to the plane 56 of the interface 48 can be varied for different widths of overlap of the sheets 30 & 32. Preferably, for greater widths of overlap, the beam 34 is more acutely angled. Although a pair of beams 34a & 34b are illustrated in FIG. 2, they are shown for depicting what portion of the top sheet 30 or both sheets 30 & 32 a beam 34 can be trained and therefore, preferably, only a single beam 34a or 34b is used to lap weld the sheets 30 & 32 together.

As is shown more clearly in FIG. 3, to form a lap weld joint, such as the welded joint 110 shown in FIG. 4 having high peel strength and with no area unfused across the width of the interface 48, the beam 34 has a sufficiently high energy density and moves longitudinally along the interface 48 at a desired speed to form the weld nugget 102. Preferably, the beam 34 has an energy density of at least 105 watts/cm² where it impinges against one or both sheets. If desired, such as for the reduction of weld defect frequency, filler metal can be supplied at the interface 48 during welding, particularly, if the gap, e, between the sheets is relatively large, such as, for example, if e is larger than 0.1 millimeter.

During welding, the heat generated can vaporize the coating 100, particularly, in the region of the weld interface 48, and preferably the coating vapor 112 flows away from the overlap or weld nugget 102 through the gap, e, between the sheets 30 & 32 and out of the interface 48. Preferably, assist gas 84 also helps force coating vapor out of the interface 48.

As is shown in FIG. 4, when completed, the resultant welded joint 110 has a weld fusion zone 114 that extends from the front of the interface 48 to the back or root side of the interface 48 such that the sheets 30 & 32, where they are overlapped 50, are fused completely in the region of the overlap 50 to produce a weld 110 having high peel strength. Preferably, the ratio of the weld length, h, to the weld width, S, or the aspect ratio of the weld 110, h/S, is relatively large to provide a weld 110 of high strength and good integrity. Preferably, after welding, the sheets 30 & 32 can be formed such as by a die stamping process, bending, deep drawing, flanging, trimming, piercing, roll-forming, hydro-forming, or by any other forming method.

FIGS. 5A through 5D illustrate preferred paths that the beam 34 can travel or the weld line produced during welding to form the lap weld 110 such that there is no unfused area across the region of overlap 50 where the beam 34 impinges on at least one of the sheets 30 & 32. Beam optics, such as a combination of mirrors and/or lenses, can be used to vary the path of travel of the beam 34 during welding. The path of travel of the laser gun assembly 72 can also be varied to vary the beam path of travel.

Figure 5A:
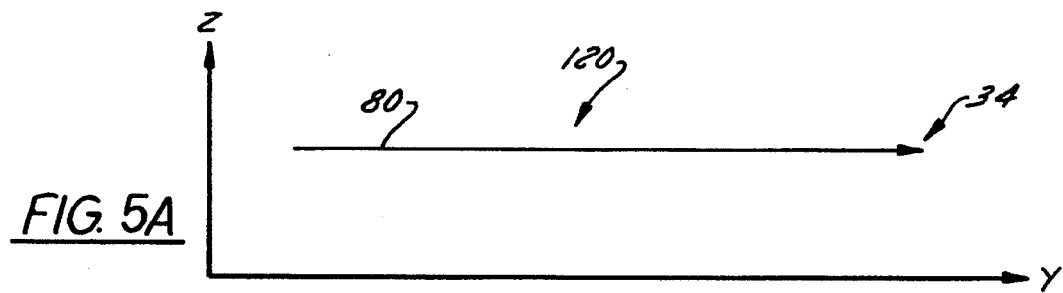
FIG. 5A is a trace depicting the beam of FIG. 1 following a straight line path of travel longitudinally along the weld interface of the overlapped sheets.
Figure 5B:
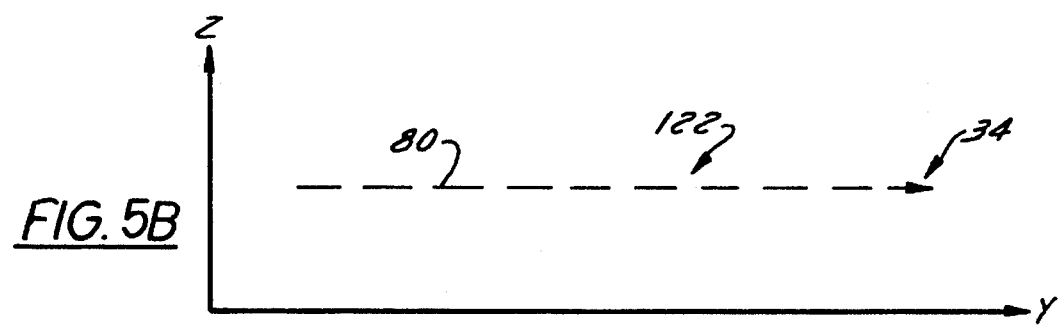
FIG. 5B is a trace depicting the beam of FIG. 1 following a discontinuous straight line path.

The beam path of travel shown in FIG. 5A is linear 120 such that the beam 34 moves along the sheets 30 & 32 shown in FIGS. 1–4 in a straight line generally in the +Y direction. FIG. 5B illustrates a discontinuous path of beam travel 122 such that the resultant lap produced is discontinuous longitudinally along the interface 48 while achieving complete fusion of the sheets 30 & 32 across the weld interface 48 from the front of the interface 48 to the back of the interface 48, producing a "stitch" lap weld having high peel strength.

Figure 5C:
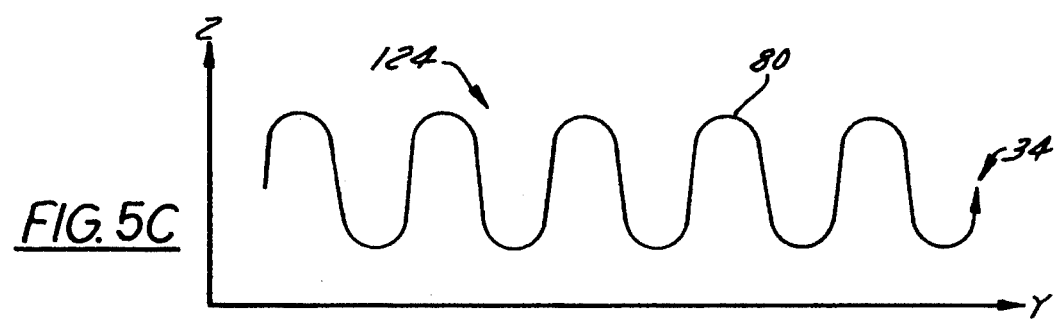
FIG. 5C is a trace depicting weaving the beam of FIG. 1 as it travels along the weld interface.

FIG. 5C illustrates an oscillating beam path 124 of travel 124 where the beam 34 oscillates relative to the Y-Z axes as it travels longitudinally in the Y direction; e.g. along the interface 48 of the sheets 30 & 32, such as for controlling or varying energy input into the sheets 30 & 32 during welding. As is shown in FIG. 5C, the beam 34 travels alternately upwardly and downwardly along the sheets 30 & 32, such as is depicted by the generally sinusoidal path 124 illustrated in FIG. 5C.

Figure 5D:
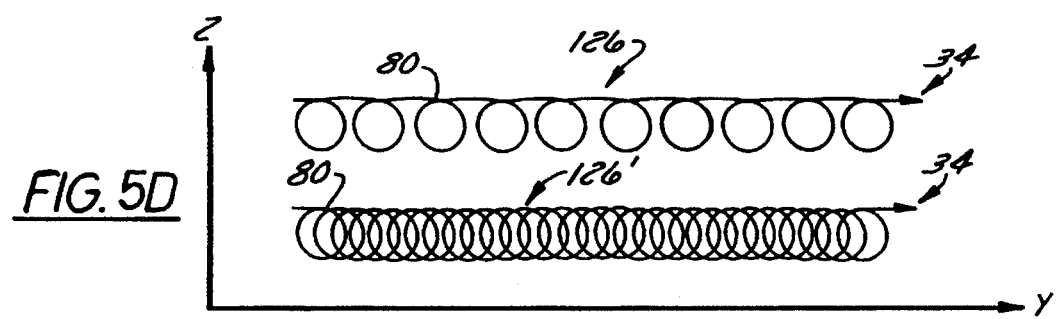
FIG. 5D are traces depicting generally circular spinning the beam of FIG. 1 as it travels along the weld interface.
Figure 5E:
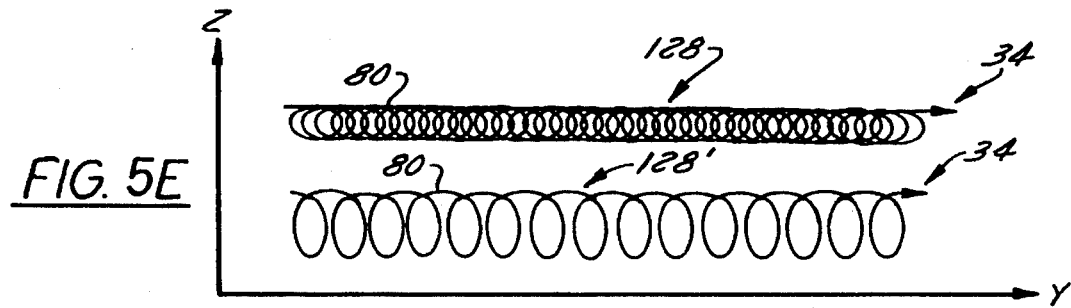
FIG. 5E are traces depicting oblong spinning of the beam of FIG. 1.

FIGS. 5D & 5E depicts spinning the beam 34 as it moves longitudinally along the weld interface 48. While FIG. 5D illustrates spinning the beam 34 so that it traces a series of circles 126 or 126' along the sheets 30 & 32 during welding, FIG. 5E depicts spinning the beam 34 so that it traces a series of ellipses or oblong shapes 128 or 128' along the sheets 30 & 32. Spinning the beam 34 as it travels along the sheets 30 & 32 is preferably done so the beam path of travel 126 or 128 overlaps itself, at least in some regions, causing melting, solidification, and re-melting/re-solidification cycles to occur where the beam path of travel has overlapped for releasing gases trapped in the weld fusion zone 114 minimizing related welding defects.

FIGS. 6A & 6B illustrated beam spot shapes at the point where the beam impinges upon the sheet or sheets which can be used in lap welding the sheets 30 & 32. Preferably, the size and shape of these beam spot shapes are chosen to provide the desired energy density where welding is taking place. As is shown in FIG. 6A, the leftmost focused beam spot 130 is circular in shape and is trained on the forward edge 40 of the top sheet 30 corresponding to, for example, beam 34a illustrated in FIG. 2. The middle beam spot 132 is also circular in shape and is directed onto both sheets 30 & 32 and toward the plane 56 of the weld interface 48 corresponding to beam 34b shown in FIG. 2. Alternatively, the beam 34 can also be oblong in shape as is shown in FIG. 6A by the right-most beam spot 134 with the major direction of this oblong shape being generally tangent to the weld line 80.

As is shown in FIG. 6B, the spot shape can also be linear or substantially rectangular. The generally rectangular beam spot can be oriented such that its longitudinal axis is generally tangent to the plane of the weld interface 48 as is shown by the leftmost generally rectangular beam spot 136 or it can be angularly offset, such as by an angle, δ, as is depicted by the middle generally rectangular beam spot 138. The angle, δ, is between about ±45° and preferably, δ, is smaller than or equal to ±10°. Alternatively, the beam spot can be oscillated back and forth as is depicted by the rightmost beam spot 140 in FIG. 6B, such as for initiating the melting-solidification, remelting-resolidification cycle.

FIG. 7 illustrates more clearly a beam optics delivery system 142 for producing a generally linear or substantially rectangular beam spot 136. As is shown in FIG. 7, the laser beam 34 is reflected by a first cylindrical mirror 144 to a second cylindrical mirror 146 to produce a generally rectangular focused beam spot 136 on the sheets 30 & 32 to join the sheets 30 & 32 by a lap 110 longitudinally along the weld interface 48. While the second mirror 146 is preferably a cylindrical mirror, the second mirror 146 can also be a parabolic mirror, elliptical mirror, or a spherical mirror for producing a generally linear or substantially rectangular focused beam spot. Preferably, the beam optics 142 are part of the laser gun assembly. If the sheets 30 & 32 are kept stationary during welding, the optics delivery system 142 is preferably moved along the sheets 30 & 32 by a robot or gantry (not shown).

FIGS. 8A through 8C illustrate a second preferred welding setup for practicing the lap welding method of this invention having the sheets 30 & 32 overlapped with each other and the weld interface 48 acutely angled relative to the direction of gravity, $F_g$, for influencing the molten weld nugget 102 during welding. Preferably, the formation, geometry and flow of the weld nugget 102 are beneficially influenced by the direction of gravity, $F_g$, during welding preferably for more easily and quickly joining the sheets 30 & 32 together forming a weld having high peel strength, good integrity, and which cannot be peeled apart, particularly, during forming after welding.

Although the sheets 30 & 32 shown in FIG. 8A through 8C are uncoated and not spaced apart by any gap where they are overlapped, the sheets 30 & 32 can be spaced apart by a gap, e, particularly if they are coated in the overlap region 50. Additionally, should the sheets 30 & 32 be spaced apart by one or more metal processing burrs, the sheets 30 & 32 can be oriented as is shown in FIGS. 8A through 8C so that the plane 56 of the weld interface 48 is acutely oriented relative to gravity, $F_g$.

As is shown in FIG. 8A, before welding, the sheets 30 & 32 are oriented and clamped such that the plane 56 of the weld interface 48 is at an acute angle, θ, to gravity, $F_g$. Preferably, the sheets 30 & 32 are oriented relative to gravity, $F_g$, such that the angle, θ, of the plane 56 of the interface 48 relative to gravity is less than about ±80° and is preferably within the range of about ±20°. Although the plane 56 of the interface 48 is preferably acutely angled relative to the direction of gravity, $F_g$, θ can be close to or equal 0° if it is desirable to orient the plane 56 of the interface 48 parallel to the direction of gravity, $F_g$, to influence the formation, shape and flow of the weld nugget 102.

FIG. 8B illustrates more clearly the weld nugget 102 during welding. In keyhole welding, the nugget 102 is composed at least in part of molten sheet material, it is in a liquefied state enabling the direction of gravity, $F_g$, to influence it, such as by influencing its formation, shape and/or flow during welding as well as perhaps other characteristics of the nugget 102. As is depicted in FIG. 8C, when welding is completed the sheets 30 & 32 are fused across the weld interface 48. The resultant weld 110 leaves no unfused area of the overlap 48 that has been welded for maximizing the peel strength and for successful post-welding forming. Preferably, the weld 110 has a high aspect ratio h/S for maximizing weld joint strength while producing a weld 110 that has a relatively narrow width, S, for increasing formability at the weld joint 110.

FIGS. 9A & 9B illustrate a continuous welding apparatus and associated welding setup 150 for practicing the method of laser welding of this invention to substantially continuously lap weld two sheets 30 & 32 that are being unrolled from coiled stock 152 & 154 and overlapped with each other. Preferably, at least some portion of the continuous welding apparatus 150 can be tilted relative to the direction of gravity, $F_g$, for orienting the sheets 30 & 32 such that the plane 56 of the weld interface 48 where the sheets 30 & 32 are overlapped is acutely angled relative to the direction of gravity, $F_g$.

During welding, sheets 30 & 32 are uncoiled and move relative to a stationary laser gun assembly 72 that focuses the laser beam 34 onto the sheets 30 & 32 to lap weld them together. After being unrolled, each sheet 30 & 32 is brought into overlapping relationship with each other adjacent the gun assembly 72 underneath the focused laser beam spot. Preferably, the sheets 30 & 32 are overlapped upstream of where the focused beam 34 impinges against the sheet or sheets 30 & 32.

As is also shown in FIGS. 9A & 9B and is illustrated more clearly in FIG. 9C, the laser gun assembly 72 is oriented relative to the plane 56 of the weld interface 48 such that the laser beam 34 is acutely angled at an angle, α, relative to the plane 56 of the weld interface 48. Preferably, the gun assembly 72 can be adjusted to adjust the angle of the beam 34 relative to the plane of the weld interface 48, such as for varying the beam angle, α, relative to the plane 56 of the weld interface 48 to increase or decrease beam penetration.

As is illustrated in FIGS. 9A & 9B, the top sheet 30 is unrolled from its coil 152 carried on a roller (not shown), and the bottom sheet 32 is unrolled from its coil 154 also carried on a roller (not shown). As the top sheet 30 is fed toward the laser gun assembly 72, the sheet 30 is supported from underneath by at least one roll 156 (shown in phantom in FIG. 9A) and on top by another roll 158 preferably overlying the bottom support roll 156. Likewise, as the bottom sheet 32 is fed toward the laser gun assembly 72, the sheet 32 is supported from underneath by at least one roll 160 and on top by another support roll 162.

Preferably, spacing between the upper and lower support rolls 156, 158, 160, & 162 supporting each sheet 30 & 32 can be varied to accommodate sheets having different thicknesses as well as coating thicknesses. Preferably, spacing between the rolls is also desirable for applying pressure to the sheet if the upper and lower rolls overlie each other so that one or more rolls can be driven to urge the sheet toward the laser gun assembly 72. Preferably, if any of the rolls are driven, they are precisely driven to accurately control the speed at which each sheet is advanced toward the gun assembly 72 to accurately control welding speed.

Although only a single pair of rollers are shown in FIGS. 9A & 9B supporting each sheet, one, two or several pairs of rollers can be used to support each sheet as it advances toward the laser gun assembly 72. Additionally, one or more pairs of rollers may be driven to controllably urge the sheet toward the gun assembly 72. If desired, pairs of non-driven rollers can be staggered and not overlie one another. In fact, a combination of driven, non-driven, staggered and non-staggered rollers can be used to guide and urge the sheets toward the gun assembly 72 during welding.

Preferably, the sheets 30 & 32 are oriented relative to each other such that the sheets 30 & 32 overlap along their edges. The top sheet 30 is preferably brought at least slightly downwardly relative to the bottom sheet 32 toward the bottom sheet 32 as the top and bottom sheets 30 & 32 are advanced toward the laser gun assembly 72. The bottom sheet 32 is preferably brought at least slightly upwardly relative to the top sheet 30 to overlap the sheets 30 & 32 for welding.

To accurately guide the upper sheet 30 as it is advanced toward the laser gun assembly 72 so that the inner sheet edge 40 is accurately located relative to the laser beam 34, at least one guide roller, ruler or rail 166 bears against the outer sheet edge 168 and at least one guide roller, ruler or rail 170 bears against the inner sheet edge 40. To guide and align the inner sheet edge 40, at least one guide roller, ruler or rail 172 bears against the outer edge 174 and at least one guide roller, ruler or guide rail 176 bears against the inner sheet edge 44. Although, only a pair of guide rollers, are shown guiding and aligning each sheet, one, two or several pairs of guide rollers, guide rulers or guide rails for each sheet can be used.

As the top sheet 30 and bottom sheet 32 are advanced toward the laser gun assembly 72, each inner guide roller 170 & 176 accurately aligns the inner edges 40 & 44 of both sheets 30 & 32 as the sheet edges are overlapped with each other to accurately control the width of overlap, w, of the sheets 30 & 32. Preferably, the outer guide rollers 166 & 172 bear against the outer edges 168 & 174 of each sheet 30 & 32 for urging the inner edges 40 & 44 of each sheet into contact with the inner guide rollers 170 & 176.

Referring additionally to FIG. 9C, an upper roller 180 and a lower roller 182 bear respectively against the top surface 184 of the top sheet 30 and the bottom surface 186 of the bottom sheet 32 to maintain the sheets 30 & 32 in overlapping relationship with each other as well as preferably control the dimension of any gap between the sheets 30 & 32. Preferably, the rolls 180 & 182 control the dimension any gap at the overlap 50 of the sheets 30 & 32 to ensure that the resultant weld 110 has no unfused area in the overlap region 50. Therefore, the distance, L, between the rollers 180 & 182 is controlled to regulate any gap, e, between the sheets 30 & 32 as the sheets 30 & 32 are being joined together. Preferably, the distance, L, between the rollers 180 & 182 can be varied to accommodate sheets of different thicknesses.

If desired, the upper and lower guide rollers 180 & 182 can function also as pressure rollers 180 & 182 to planish the sheets 30 & 32 in the overlap region 50 during welding or shortly after welding in the overlap region 50 has been performed. If the rollers 180 & 182 function as pressure rollers, the rollers 180 & 182 preferably apply a force, $F_f$, to each sheet to urge them together during welding or immediately after welding has taken place. If the rollers 180 & 182 function as pressure rollers, as the overlapped sheets 30 & 32 pass through the nip of the rollers 180 & 182, each roller applies pressure, $F_f$, to each sheet for reducing the thickness, $t_1$, of the top sheet 30 and the thickness, $t_2$, of the top sheet 32 to a thickness, $t_3$, equal to or less than combined thickness of the sheets 30 & 32. After welding, the welded sheets 30 & 32 can be cut to size, blanked, stamped, or continuously roll-formed, if desired.

Figure 10:
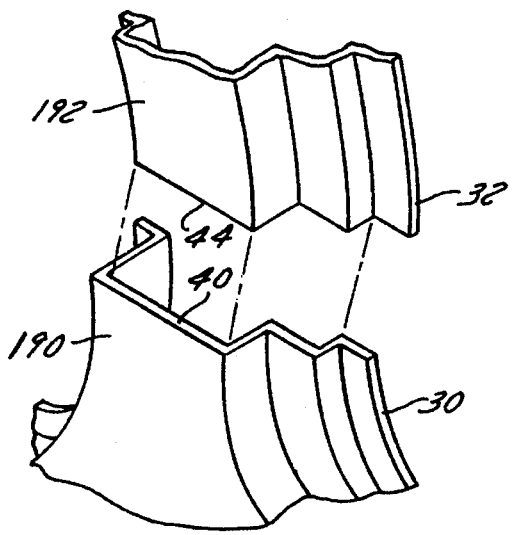
FIG. 10 is a perspective view of a pair of three-dimensionally contoured sheets being located and fixtured for welding.
Figure 12:
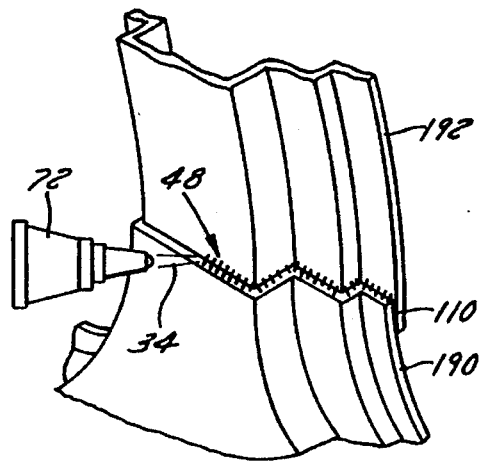
FIG. 12 is a perspective view of the three-dimensionally contoured sheets being welded after being located and fixtured for welding.
Figure 13:
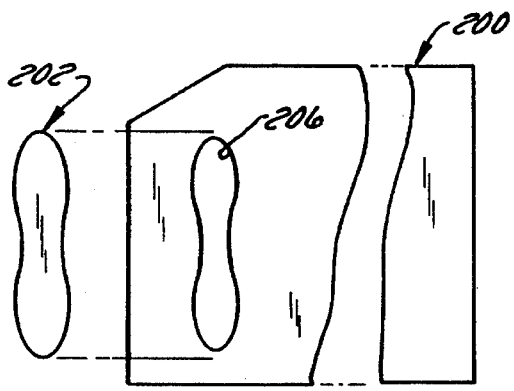
FIG. 13 is a top view of a flat vehicle door panel and a flat hinge reinforcing panel.

FIGS. 10 through 12 illustrate utilizing the welding method of this invention used to lap weld a pair of three-dimensionally formed or contoured sheets 190 & 192 to produce a three-dimensionally contoured component 194, such as a center pillar for an automotive vehicle body. As is shown in FIG. 10, before welding, the sheets 190 & 192 are overlapped, placed against each other and fixtured by clamps 52 & 54 in preparation for welding. Preferably, the sheets 190 & 192 are oriented relative to the direction of gravity, $F_g$, such that the plane 56 of the weld interface 48 is acutely angled relative to the direction of gravity, $F_g$, such as is shown more clearly in FIG. 11. After the sheets 190 & 192 are overlapped and fixtured, the laser gun assembly 72 moves relative to the sheets 190 & 192 to lap weld them together, as is shown more clearly in FIG. 12, forming a weld 110 completely fusing the weld joint interface 48 providing the weld 110 with high peel strength.

Figure 17:
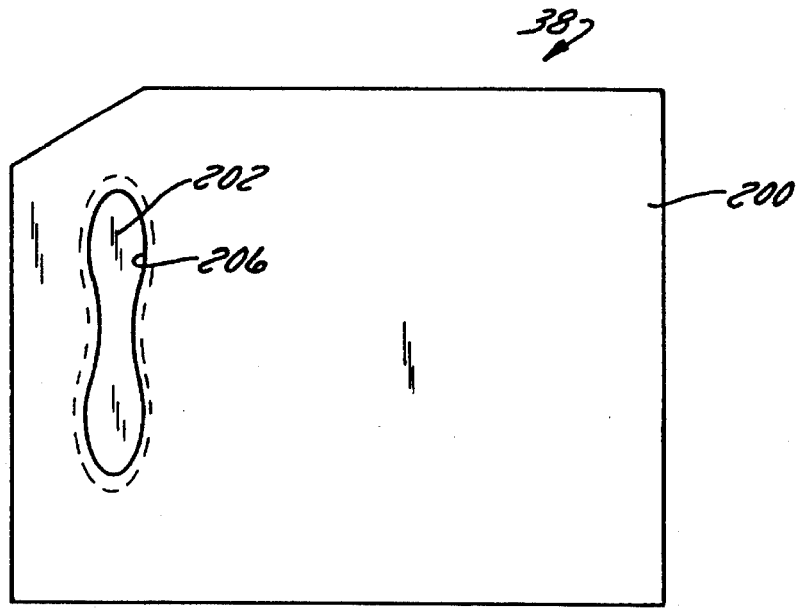
FIG. 17 is a top view of the panels after welding illustrating more clearly that they form a blank.
Figure 18:
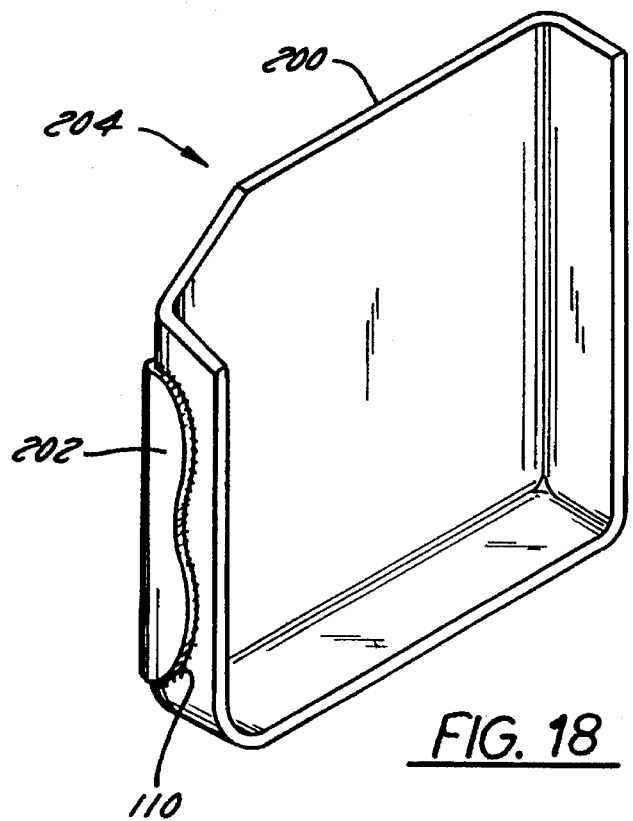
FIG. 18 is a perspective view of the blank after being formed by a conventional forming process.

FIGS. 13 through 18 illustrate construction of a blank 38 (FIG. 17) made of a flat vehicle door panel 200 and a hinge reinforcing panel 202 using the welding method of this invention that is formed after welding to produce a three-dimensionally contoured door panel 204 (FIG. 18). So that the hinge reinforcing panel 202 can be welded to the flat door panel 200, the door panel 200 undergoes a stamping operation to remove a portion 206 of the door panel 200 in the area where the hinge reinforcing panel 202 will be attached.

Preferably, the hinge reinforcing panel 202 is constructed of sheet material having different properties or different thickness from the material of the flat door panel 200. For example, the hinge reinforcing panel 202 can be constructed of stronger material, thicker material or sound dampening material to impart to the finished three-dimensionally contoured door panel assembly 204 the desired properties at least in the region of where the door hinge attaches the assembly 204 to a vehicle. For example, as is more clearly shown in FIG. 15, the thickness, $t_1$, of the hinge reinforcing panel 202 can be 1.8 millimeters, while the thickness, $t_2$, of the flat door panel 200 can be about 0.8 millimeters. Preferably, the panels 200 & 202 are constructed of a formable aluminum, an automotive deep drawing steel or a combination of metals.

If steel is used for any of the panels 200 & 202, the steel can be, for example, an automotive deep drawing steel having a yield strength of between approximately twenty to eighty kilograms per square inch (ksi) and which is preferably galvanized for corrosion resistance. If galvanized, the steel panel material can have a coating designation of, for example, 70 G/70 G, that is, having seventy grams of zinc coating per square meter of sheet. However, one or both sheets can be coated with another type or amount of organic or metallic coating, if desired.

Figure 14:
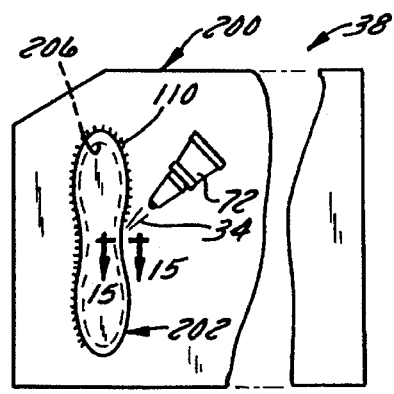
FIG. 14 is a top view of the hinge reinforcing panel placed in overlapping contact with the door panel blank and being welded to the door panel to form a blank.
Figure 15:
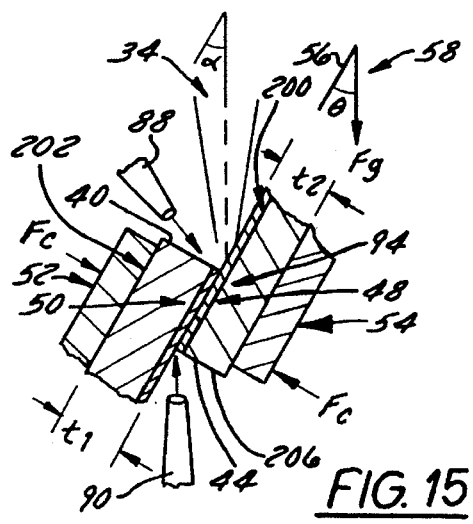
FIG. 15 is an enlarged fragmentary sectional view of the panels taken along line 15—15 of FIG. 14 illustrating in more detail welding of the hinge reinforcing panel to the door panel blank.
Figure 16:
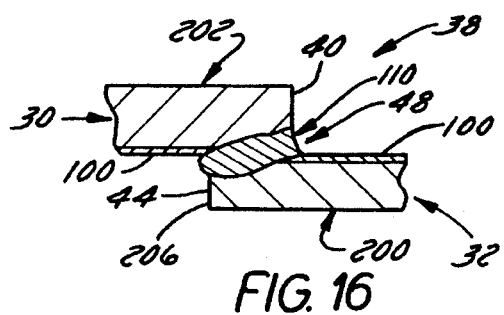
FIG. 16 is an enlarged fragmentary sectional view of the panels after welding has been completed.

As is shown in FIGS. 14 & 15, so that the hinge reinforcing panel 202 can be welded to the flat door panel 200, the hinge reinforcing panel 202 is at least slightly larger in size than the complementary stamped opening 206 in the door panel 200 so the hinge reinforcing panel 202 will overlap the door panel 200 preferably completely about the periphery of the hinge reinforcing panel 202. FIGS. 14 & 15 also illustrate the hinge reinforcing panel 202 overlying the opening in the door panel 200 and being lap welded about its periphery to join the reinforcing panel 202 to the door panel 200. As is shown more clearly, the laser beam 34 is acutely angled relative to the plane 56 of the weld interface 48 for joining the sheets together forming a weld 110 having sufficiently high peel strength such that it will not peel apart during three-dimensionally forming the welded panels 200 & 202 into a three-dimensionally contoured door panel assembly 204.

After welding is finished, the blank 38 is three-dimensionally formed into the shape of a three-dimensionally contoured component or product. As is shown in FIG. 17, the door panel blank 38 is formed into the three-dimensionally contoured vehicle door panel 204 illustrated in FIG. 18 for assembly as part of a door that will be assembled to a vehicle body. Lap welded portions 110 where the hinge reinforcing panel 202 is secured to the door panel 200 can also be three-dimensionally contoured as the blank 38 is shaped. As is more clearly illustrated in FIG. 18, a portion of the hinge reinforcing panel 202 is bent during forming, thereby also bending the lap weld 110 joining the hinge reinforcing panel 202 to the door panel 200.

EXAMPLE

As an example of the construction of the automobile inner door panel 204, the hinge reinforcing panel 202 has a thickness, $t_1$, of 2 millimeters and the flat door main panel 200 has a thickness, $t_2$, of 1 millimeter. Preferably, both panels 200 & 202 are constructed of an automotive deep drawing steel and which is 70 G/70 G coated for corrosion protection. When overlapped, the width of overlap, w, of the panels 200 & 202 is preferably 110% of the thickness of the thinnest panel or about w=1.1 millimeter. When fixtured, clamps 52 & 54 preferably apply a clamping pressure, $F_c$, to each panel 200 & 202 of about 2,000 pounds along a five foot long joint 48 to fixture and retain the panels 200 & 202 in overlapping relationship during welding. Refrigerated water preferably flows through copper clamps 52 & 54 to cool the external surfaces of the overlap region 50 of the panels 200 & 202.

To weld the panels 200 & 202 together, for example, a six kilowatt $CO_2$ laser can be used with an output beam diameter, $b_D$, of about 50 millimeters. The beam delivery system can be composed of flat reflective polished copper optics and one focusing optic with the focusing optic having, for example, a focal length of approximately f=150 millimeters to produce a focused beam spot where the beam impinges at the weld interface against the panels 200 and/or 202 of about 0.3 millimeter diameter.

In this illustration, the focused laser beam 34 is directed at the forward edge 40 of the hinge reinforcing panel 202 at an angle $\alpha=20°$ relative to the plane 56 of the weld or overlap interface 48 and the panels 200 & 202 are fixtured so they are oriented relative to the direction of gravity, $F_g$, such that the plane 56 of the weld or overlap interface 48 is at an angle of approximately $\theta=20°$ so that the direction of gravity, $F_g$, influences the formation, geometry and flow of the weld nugget. During welding, the laser beam 34 travels along the weld or overlap interface 48 in a direction generally tangent to the interface 48 at a welding speed of V=6 meters per minute.

During welding, assist gas, such as argon, is directed where the beam 34 impinges upon the forward edge 40 of the hinge reinforcing panel 202 at a flow rate of about twenty cubic feet per hour through an injector nozzle 88 having a tube diameter of approximately 4 millimeters. Preferably, assist gas is also injected toward the root side of the weld or overlap interface 48 where welding is taking place.

Use and Operation

In use, the method of welding of this invention is used to join one sheet that has been overlapped with another sheet for producing a lap weld in the overlap region that joins the sheets completely together in the overlap region and which possesses high peel strength to enable the sheets to be formed or shaped after welding, even in the region of the lap weld 110 and which produces a joint with high tensile strength and high resistance to fatigue. The lap welding method of this invention utilizes a high energy density radiation beam 34, that preferably is a laser beam, for producing a lap weld 110 having virtually no unfused area across the region of the overlap or weld interface 48 between the sheets so that the sheets will not peel apart during forming or shaping of the sheets or due to fatigue cracking in the region of the weld 110. The resultant lap weld construction produced using this method also advantageously preferably minimizes or prevents wrinkling, buckling, cracking as well as splitting in the region of the weld 110 during shaping or forming. Additionally, the resultant lap weld 110 minimizes dust collection and corrosion in the weld region because cracks and crevices in the weld 110 are minimized and preferably prevented. Finally, the resultant lap weld construction 110 also prevents fatigue failure because the weld joint is completely fused virtually eliminating any crack initiation sites in the region of the weld 110.

In operation, referring once again to FIGS. 1 through 4, the sheets 30 & 32 are overlapped and fixtured for welding. After the sheets 30 & 32 have been fixtured, the laser beam 34 is brought to bear against one or both sheets to weld them together. To weld them together producing a joint having high peel strength, the beam 34 is preferably acutely angled relative to the plane 56 of the weld interface 48 and is directed toward the plane 56 of the interface 48. To influence the formation, geometry and flow of the nugget 102 during welding, the sheets 30 & 32 are preferably oriented relative to the direction of gravity, $F_g$, so that the plane 56 of the interface 48 is acutely angled relative to the direction of gravity, $F_g$.

When welding is completed, the resultant lap 110 extends from front to back of the weld interface 48 or overlap of the sheets 30 & 32 leaving no region 50 unfused to provide the weld 110 with high peel strength so that the sheets 30 & 32 will not peel apart during forming or shaping of the sheets 30 & 32, even in the region of the weld 102. Preferably, after welding is completed, the sheets 30 & 32 form a blank 38 that is shaped or formed using conventional shaping or forming methods.

It is also to be understood that, although the foregoing description and drawings describe and illustrate in detail working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A method of welding using a high energy density radiation beam comprising the steps of:
   (a) providing a sheet having a sheet edge and another sheet having a sheet edge;
   (b) overlapping one of the sheets with the other sheet such that the edge of one sheet underlies the other sheet and the edge of the other sheet overlies the one sheet forming a lap joint having a plane of overlap where the sheets overlap with the overlap forming an overlap interface and defining a weld line;
   (c) training a high energy density radiation beam on at least one of the sheets for a period of time and with sufficient energy density to weld the sheets together where overlapped such that the sheets are substantially completely fused together across the cross sectional width of overlap of the sheets; and
   (d) forming or shaping the sheets after the high energy density radiation beam has been trained on at least one of the sheets with the sheets being formed such that at least one of the sheets and a portion of the weld line are bent or three dimensionally contoured during forming.

2. The high energy density beam welding method of claim 1 wherein the beam of high energy density radiation is a laser beam.

3. The high energy density beam welding method of claim 1 wherein the beam of high energy density radiation is an electron beam.

4. The high energy density radiation beam welding method of claim 1 wherein the sheets are formed using one of the following methods of forming: shaping, drawing, deep drawing, hydro-forming, bending, or roll forming wherein at least one of the sheets and a portion of the weld are bent or three dimensionally contoured during forming.

5. The high energy density radiation beam welding method of claim 1 wherein:
   (1) the sheets are oriented relative to a vertical plane generated by the direction of the local gravity and the tangent to the weld line in the plane of the overlap interface such that the plane of the overlap interface is acutely angled relative to the vertical plane so that the direction of the local gravity influences at least one of the following: formation, geometry or flow of a weld nugget of molten sheet material that is formed during welding; and
   (1) the beam is angled acutely to the plane of overlap and trained (aa) on a sheet edge of one of the sheets or (bb) on a sheet edge of one of the sheets and a portion of the other of the sheets.

6. The high energy density radiation beam welding method of claim 5 wherein the angle between the plane of the overlap interface and the vertical plane is within the range of about ±20°.

7. The high energy density radiation beam welding method of claim 6 wherein the sheets are oriented relative to the direction of gravity such that the plane of the overlap interface is substantially parallel to the direction of gravity.

8. The high energy density radiation beam welding method of claim 1 wherein the beam is acutely angled relative to the plane of overlap of the sheets during welding.

9. The high energy density radiation beam welding method of claim 1 wherein the weld produced is a lap weld having no lip or portion of width of the overlap interface of the sheets left unfused when welding is completed.

10. The high energy density radiation beam welding method of claim 1 wherein the lap weld produced is continuous along the weld line.

11. The high energy density radiation beam welding method of claim 1 wherein one of the sheets has at least one (1) mechanical property or (2) at least one metallurgical property that is different than the other of the sheets.

12. The high energy density radiation beam welding method of claim 1 wherein one of the sheets is thicker than the other of the sheets.

13. The high energy density radiation beam welding method of claim 1 wherein the weld line is not straight.

14. The high energy density radiation beam welding method of claim 1 wherein one of the sheets has a thickness of $t_1$ and the other of the sheets has a thickness of $t_2$ and the sheets are overlapped such that the cross sectional width of overlap of the weld interface is at least about 50% of the thickness of the smallest of $t_1$ and $t_2$ and no greater than about twice the thickness of the largest of $t_1$ and $t_2$.

15. The high energy density radiation beam welding method of claim 14 wherein the cross sectional thickness of each sheet before welding is at least about 0.5 millimeter and no greater than about 5 millimeters.

16. The high energy density radiation beam welding method of claim 15 wherein after forming at least one of the sheets and a portion of the weld line are bent.

17. The high energy density radiation beam welding method of claim 1 wherein at least one of the sheets is coated with an organic or metallic coating.

18. The high energy density radiation beam welding method of claim 1 wherein both of the sheets have a thickness greater than 0.2 millimeter.

19. The high energy density radiation beam welding method of claim 18 wherein the cross sectional thickness of each sheet before welding is at least 0.5 millimeter and no greater than 5 millimeters.

20. A method of welding using a high energy density radiation beam comprising the steps of:
   (a) providing a first sheet having a thickness $t_1$ with the first sheet having a sheet edge, a second sheet having a sheet edge and being of a thickness $t_2$ that is less than the thickness $t_1$ of the first sheet, and an emitter of a beam of high energy density radiation for welding the sheets together;
   (b) overlapping one of the sheets with the other sheet such that the edge of one sheet underlies the other sheet and the edge of the other sheet overlies the one sheet forming a plane of overlap where the sheets overlap, with the overlap between the sheets forming an overlap interface or a weld interface that defines a weld line and which has a cross sectional width of overlap of the weld interface that extends from the edge of the first sheet to the edge of the second sheet;
   (c) orienting the sheets relative to the emitter of high energy density radiation such that at least one of the sheets is exposed to the emitter;

(d) training a high energy density radiation beam on at least one of the sheets for a period of time and with sufficient energy density to weld the sheets together where overlapped such that along a portion of the weld line the sheets are substantially completely fused across the cross sectional width of overlap of the sheets; and (e) forming or shaping at least one of the sheets and at least a portion of the weld line such that at least one of the sheets and a portion of the weld line are bent or three dimensionally contoured.

21. The high energy density radiation beam welding method of claim 20 wherein the lap weld joining the sheets together is continuous longitudinally along the weld line.

22. The high energy density radiation beam welding method of claim 20 wherein the sheets are overlapped such that the cross sectional width of overlap of the weld interface is at least about 50% of the thickness of the smallest of $t_1$ and $t_2$ and no greater than about twice the thickness of the largest of $t_1$ and $t_2$.

23. The high energy density radiation beam welding method of claim 22 wherein the high energy density radiation beam is acutely angled relative to the plane of overlap of the sheets.

24. The high energy density radiation beam welding method of claim 23 wherein the cross sectional thickness of each sheet before welding is at least 0.5 millimeter and no greater than 5 millimeters.

25. The high energy density radiation beam welding method of claim 24 wherein during welding the high energy density radiation beam is trained on at least a portion of the edge of the thicker sheet.

26. The high energy density radiation beam welding method of claim 25 wherein the sheets are oriented such that the plane of overlap is acutely angled relative to the direction of the local gravity with the thicker sheet edge being above the thinner sheet edge such that during welding molten liquid sheet material from the thicker sheet edge flows in between the overlapped region of the sheets for helping to produce a weld that completely fuses the sheets together across the entire width of overlap of the sheets.

27. The high energy density radiation beam welding method of claim 26 wherein at least a portion of both sheets are galvanized and overlapped such that the sheet surfaces which face each other in the region of overlap are coated with a zinc coating.

28. The high energy density radiation beam welding method of claim 20 wherein one of the sheets has (1) at least one mechanical property or (2) at least one metallurgical property that is different from the other of the sheets.

29. The high energy density radiation beam welding method of claim 20 wherein during step (d) the high energy density radiation beam is trained on the sheet edge of one of the sheets and a portion of the other of the sheets.

30. The high energy density radiation beam welding method of claim 20 wherein after step (d), comprising the further step of forming or shaping the sheets such that at least one of the sheets and a portion of the weld line are bent or three dimensionally contoured during forming using one of the following methods of forming: drawing, deep drawing, hydro-forming, bending, or roll forming.

31. The high energy density radiation beam welding method of claim 30 wherein a portion of the weld is bent or three dimensionally contoured during forming.

32. The high energy density radiation beam welding method of claim 22 wherein in step (c) the sheets are oriented relative to the beam emitter such that the sheet edge of the thicker sheet is exposed to the emitter, and during step (d) the beam is trained on at least a portion of the sheet edge of the thicker sheet to weld the sheets together.

33. The high energy density radiation beam welding method of claim 20 wherein the sheets are oriented relative to a vertical plane generated by the direction of the local gravity and the tangent to the weld line in the plane of the overlap interface such that the plane of the overlap interface is acutely angled relative to the vertical plane so that the direction of the local gravity influences at least one of the following: formation, geometry or flow of a weld nugget of molten sheet material that is formed during welding.

34. The high energy density radiation beam welding method of claim 20 wherein after forming at least one of the sheets and a portion of the weld line are three dimensionally contoured.

35. A method of welding using a high energy density radiation beam comprising the steps of:

(a) providing a first sheet having a top surface, a bottom surface and a sheet edge, a second sheet having a top surface, a bottom surface and a sheet edge, and one of the sheets having a burr extending outwardly from adjacent its sheet edge, a clamp for engagement with the first sheet, another clamp for engagement with the second sheet, and an emitter of a beam of high energy density radiation for welding the sheets together;

(b) overlapping the sheets with a clamp in engagement with the first sheet, a clamp in engagement with the second sheet, and having one of the sheets overlapped with the other of the sheets such that the edge of the one sheet underlies the other sheet and the edge of the other sheet overlies the one sheet forming a lap joint having a plane of overlap where the sheets overlap each other, with the overlapped sheets spaced apart by a gap between the sheets with the burr on one sheet facing generally toward one of the top and bottom surfaces of the other sheet, and the overlap between the sheets forming a weld interface or overlap interface that defines a weld line and which has a cross sectional width of overlap of the overlap interface that extends from the edge of one of the sheets to the edge of the other of the sheets;

(c) orienting the sheets relative to the emitter such that a sheet edge of one of the sheets is exposed to the emitter; and (d) training a high energy density radiation beam angled acutely to the plane of overlap on the sheet edge of the first sheet and along the weld line for a period of time and with sufficient energy density to weld the sheets together where overlapped such that along at least a portion of the weld line the sheets are completely fused across the cross sectional width of the overlap interface of the sheets with there being no lip or portion of the width of the overlap interface of the sheets left unfused.

36. The high energy density radiation beam welding method of claim 35, after step (c), comprising the further step of forming or shaping the sheets such that at least one of the sheets and a portion of the weld line are bent or three dimensionally contoured during forming using one of the following methods of forming: shaping, drawing, deep drawing, hydro-forming, roll forming, or any other forming or shaping method wherein at least one of the sheets and the weld line are bent or three dimensionally contoured during forming or shaping.

37. The high energy density radiation beam welding method of claim 36 wherein a portion of the weld is bent or three dimensionally contoured during forming or shaping.

38. The high energy density radiation beam welding method of claim 35 further comprising:

(1) orienting the sheets relative to the emitter such that the sheet edge of the first sheet is exposed to the emitter;

(2) orienting the sheets relative to the direction of the local gravity such that the sheet edge of the first sheet lies above the sheet edge of the second sheet wherein the plane of overlap of the sheets is downwardly inclined and acutely angled relative to the direction of the local gravity; and (3) during step (b) or after step (b), controlling the gap between the sheets such that the gap between the sheets is no greater than about ten percent of sheet thickness of the thicker of the sheets.

39. The high energy density radiation beam welding method of claim 38 wherein the gap between the overlapped sheets is controlled to be no greater than about 0.1 millimeter by (1) selectively regulating the distance the clamps are spaced apart from each other or (2) selectively regulating force applied by at least one of the clamps against at least one of the sheets.

40. The high energy density radiation beam welding method of claim 35 wherein at least one of the sheets has a zinc coating.

41. A method of welding using a high energy density radiation beam comprising the steps of:

(a) providing a first sheet having a sheet edge and composed of a material having mechanical or metallurgical properties, a second sheet having a sheet edge and composed of a material having (1) mechanical or metallurgical properties and (2) at least one mechanical or metallurgical property that is different than the mechanical or metallurgical properties of the first sheet;

(b) overlapping one of the sheets with the other sheet such that the edge of one sheet underlies the other sheet and the edge of the other sheet overlies the one sheet forming a plane of overlap where the sheets overlap, with the overlap between the sheets forming an overlap interface that defines a weld line and which has a cross sectional width of overlap of the overlap interface that extends from the edge of one of the sheets to the edge of the other of the sheets;

(c) training a high energy density radiation beam on one of the sheets and along the weld line for a period of time and with sufficient energy density to weld the sheets together where overlapped such that along at least a portion of the weld line the sheets are completely fused across the cross sectional width of overlap of the sheets; and (d) forming or shaping at least one of the sheets and at least a portion of the weld line such that at least one of the sheets and at least a portion of the weld line are bent and possess a radius of curvature after forming or shaping is completed.

42. The high energy density radiation beam welding method of claim 41 wherein forming is done using one of the following methods of forming: shaping, drawing, deep drawing, hydro-forming, and roll forming.

43. The high energy density radiation beam welding method of claim 42 wherein a portion of the weld is bent or three dimensionally contoured during forming.

44. The high energy density radiation beam welding method of claim 41 wherein the high energy density radiation beam is trained on a sheet edge of one of the sheets during step (c) for a period of time and with sufficient energy density to weld the sheets together where overlapped such that the sheets are completely fused across the entire cross sectional width of overlap of the sheets along at least a portion of the weld line in a longitudinal direction along the weld line.

45. The high energy density radiation beam welding method of claim 41 wherein one of the sheets is thicker than the other of the sheets.

46. The high energy density radiation beam welding method of claim 41 wherein one of the sheets possesses greater strength than the other of the sheets.

47. A product resulting from practicing the method of lap welding two sheets overlapped with each other using a high energy density radiation beam with one sheet overlapped with the other sheet such that the edge of one sheet underlies the other sheet and the edge of the other sheet overlies the one sheet defining a weld line and an overlap interface, with the width of overlap extending from the edge of one of the sheets to the edge of the other of the sheets, and the high energy density radiation beam trained on at least one of the sheets for a period of time and with sufficient energy density to weld the sheets together where overlapped wherein the welded sheets are formed or shaped such that at least one of the sheets and a portion of the weld line are bent or three dimensionally contoured after welding.

48. The product of claim 47 wherein during welding the high energy density radiation beam is angled acutely to the plane of overlap of the sheets and trained on either the edge of one of the sheets or on the edge of one of the sheets and a portion of the other sheet.

49. The product of claim 47 wherein one of the sheets has at least one mechanical or metallurgical property that is different than the other of the sheets.

50. The product of claim 49 wherein the different property relates to one of the following: toughness, impact resistance, ductility, formability, yield strength, ultimate strength, surface texture, surface hardness, wear resistance, fatigue resistance, electrical conductivity, flexural rigidity, stiffness or another sheet material property that is a mechanical or metallurgical property.

51. The product of claim 47 wherein one of the sheets has a greater thickness than the other of the sheets.

52. The product of claim 47 wherein before forming the weld line is not straight.

53. The product of claim 47 wherein the weld is continuous along the weld line.

54. The product of claim 47 wherein the weld produced is a lap weld having no lip or portion of the width of the overlap interface of the sheets left unfused when welding is completed.

55. The product of claim 47 wherein one of the sheets has a thickness of $t_1$ and the other of the sheets has a thickness of $t_2$ and the sheets are overlapped such that the cross sectional width of overlap of the overlap interface is at least about 50% of the thickness of the smallest of $t_1$ and $t_2$ and no greater than about twice the thickness of the largest of $t_1$ and $t_2$.

56. The product of claim 55 wherein the cross sectional thickness of each sheet before welding is at least 0.5 millimeter and no greater than 5 millimeters and after welding the sheets are joined together such that along at least a portion of the weld line the sheets are completely fused across the entire cross sectional width of overlap.

57. The product of claim 47 wherein forming is done using one of the following methods of forming: shaping, drawing, deep drawing, hydro-forming, and roll forming.

58. The product of claim 47 wherein the welded sheets are formed or shaped such that at least one of the sheets and a portion of the weld are bent or three dimensionally contoured after welding.

59. A method of welding using a laser beam comprising the steps of:

(a) providing a metal sheet having a cross sectional thickness, $t_1$, and a sheet edge and another metal sheet having a cross sectional thickness, $t_2$, and a sheet edge wherein each sheet has a cross sectional thickness of at least about 0.5 millimeter and no greater than about 5 millimeters;

(b) overlapping one of the sheets with the other sheet such that the edge of one sheet underlies the other sheet and the edge of the other sheet overlies the one sheet forming a lap joint having a plane of overlap where the sheets overlap, with the overlap forming a weld interface and defining a weld line, and the sheets overlapped such that the cross sectional width of overlap of the weld interface is at least about fifty percent of the thickness of the smallest of $t_1$ and $t_2$ and no greater than about twice the thickness of the largest of $t_1$ and $t_2$;

(c) training the laser beam angled acutely to the plane of overlap on at least one of the sheets for a period of time and with sufficient energy density to weld the sheets together where overlapped such that the sheets are substantially completely fused together across the cross sectional width of overlap of the sheets; and (d) forming or shaping the sheets such that at least one of the sheets and a portion of the weld line are bent or three dimensionally contoured.

60. The method of claim 59 wherein the laser beam spot where focused on at least of the sheets has an energy density of at least about $10^5$ watts per square centimeter for achieving deep penetration keyhole mode welding.

61. The method of claim 60 wherein the laser beam is trained on a portion of the sheet edge of one of the sheets and a portion of the other of the sheets.

62. The method of claim 60 wherein the sheets are oriented such that the plane of overlap is acutely angled relative to the direction of the local gravity with the sheet edge of one of the sheets being above the sheet edge of the other sheet for helping to produce a weld that substantially completely fuses the sheets together across the entire width of overlap of the sheets.

63. The method of claim 62 wherein both sheets are constructed of galvanized steel coated with zinc at least on the surfaces that face each other in the region where the sheets are overlapped with each other.

64. The method of claim 59 further comprising reducing the thickness of the sheets where they are overlapped before, during or after welding.

65. The method of claim 64 wherein the combined total thickness of the overlapped sheets is reduced by planishing.

66. The method of claim 59 wherein during welding the beam path of travel overlaps itself as the laser beam travels along the weld interface to melt, solidify, remelt, and resolidify sheet material to remove gas trapped in the sheet material.

67. The method of claim 59 wherein during welding the laser beam oscillates across the weld interface as it travels longitudinally along the weld interface.

* * * * *